US011346405B2

(12) United States Patent
Van Druten et al.

(10) Patent No.: US 11,346,405 B2
(45) Date of Patent: May 31, 2022

(54) CLUTCH SYSTEM FOR A TORQUE TRANSMISSION

(71) Applicant: Advancing Technologies B.V., Eindhoven (NL)

(72) Inventors: Roëll Marie Van Druten, Eindhoven (NL); Johannes Gijsbertus Antonius Van Den Brand, Eindhoven (NL)

(73) Assignee: ADVANCING TECHNOLOGIES B.V., Eindhoven (NL)

( * ) Notice: Subject to any disclaimer, the term of this patent is extended or adjusted under 35 U.S.C. 154(b) by 13 days.

(21) Appl. No.: 16/608,514

(22) PCT Filed: Apr. 26, 2018

(86) PCT No.: PCT/NL2018/050273
§ 371 (c)(1),
(2) Date: Oct. 25, 2019

(87) PCT Pub. No.: WO2018/199757
PCT Pub. Date: Nov. 1, 2018

(65) Prior Publication Data
US 2020/0182313 A1 Jun. 11, 2020

(30) Foreign Application Priority Data

Apr. 27, 2017 (NL) .................................... 2018802
Dec. 28, 2017 (NL) .................................... 2020191

(51) Int. Cl.
*F16H 3/46* (2006.01)
*F16D 41/30* (2006.01)
(Continued)

(52) U.S. Cl.
CPC ............. *F16D 41/30* (2013.01); *F16D 41/12* (2013.01); *F16H 3/46* (2013.01); *F16H 9/26* (2013.01);
(Continued)

(58) Field of Classification Search
CPC ...... F16D 41/30; F16D 41/12; F16D 2121/14; F16D 2125/50; F16D 41/24; F16H 3/46; F16H 9/26; B62M 9/12
See application file for complete search history.

(56) References Cited

U.S. PATENT DOCUMENTS

| 2,143,121 A * | 1/1939 | Cox ........................ F16D 41/12 |
| | | 192/43.1 |
| 10,696,356 B2 * | 6/2020 | Chen ....................... B60B 30/02 |

(Continued)

FOREIGN PATENT DOCUMENTS

EP 2586694 A1 5/2013

OTHER PUBLICATIONS

Invitation to Pay Additional Fees and Partial International Search Report dated Aug. 30, 2018 issued in corresponding International Patent Application No. PCT/NL2018/050273 (11 pgs ).

*Primary Examiner* — David J Hlavka
(74) *Attorney, Agent, or Firm* — Pillsbury Winthrop Shaw Pittman, LLP

(57) ABSTRACT

A clutch system for a torque transmission. The clutch system includes a first rotatable unit connectable to an input, including at least one first abutment surface and a second rotatable unit connectable to an output, including at least one second abutment surface arranged for selectively engaging the first abutment surface. The first and second abutment surfaces being adapted to each other so as to allow disengaging under load. The system includes a third rotatable unit arranged for selectively being in a first position or a second position relative to the second rotatable unit, wherein at least one retaining member of the third rotatable unit selectively locks the at least one second abutment surface in engagement with the at least one first abutment surface for selectively rotationally coupling the second rotatable unit to the first rotatable unit.

30 Claims, 14 Drawing Sheets

(51) Int. Cl.
  *F16D 41/12*  (2006.01)
  *F16H 9/26*  (2006.01)
  *B62M 9/12*  (2006.01)
  *F16D 121/14*  (2012.01)
  *F16D 125/50*  (2012.01)

(52) U.S. Cl.
  CPC ........... *B62M 9/12* (2013.01); *F16D 2121/14* (2013.01); *F16D 2125/50* (2013.01)

(56) References Cited

U.S. PATENT DOCUMENTS

2008/0194376 A1* 8/2008 Kamiya ................. B62M 11/16
  475/297
2010/0252389 A1* 10/2010 French .................... F16D 41/24
  192/64
2016/0186821 A1* 6/2016 Alley ...................... F16D 41/26
  192/45.1

* cited by examiner

CLUTCH SYSTEM FOR A TORQUE TRANSMISSION

CROSS-REFERENCE TO RELATED APPLICATIONS

This application is the U.S. National Stage of PCT/NL2018/050273, filed Apr. 26, 2018, which claims priority to: Netherlands Patent Application No. 2018802, filed Apr. 27, 2017, and Netherlands Patent Application No. 2020191, filed Dec. 28, 2017, the entire contents of each of which are herein incorporated by reference in their entireties.

FIELD OF THE INVENTION

The invention relates to a clutch system for a torque transmission having an input arranged for connection to a drive source, and an output arranged for connection to a load.

BACKGROUND TO THE INVENTION

Transmission systems, e.g. for vehicles, windmills etc., are known. In bicycles, especially racing bicycles, the transmission system traditionally includes a front derailleur and a rear derailleur, for shifting gears of the transmission system. An alternative to derailleurs is formed by gear hubs, where shifting of gears is accommodated by a gear shifting mechanism inside the, generally rear, wheel hub. A hybrid form is known where a gear hub torque transmission having at least two selectable gear ratios is coupled between the rear wheel hub and the rear sprocket. Herein the rear sprocket can include a plurality of gear wheels, selectable through a rear derailleur. Here the gear hub can take the place of a front derailleur.

Such gear hub gear shifting mechanisms can include one or more planetary gear sets. The planetary gear includes at least three rotational members, such as a sun gear, a planet carrier and a ring gear. A clutch system can be used for selectively coupling two of the rotational members, e.g. the planet carrier and the ring gear. When coupled, the hub gear shifting mechanism operates according to a first gear ratio. When decoupled, the hub gear shifting mechanism operates according to a second gear ratio.

SUMMARY OF THE INVENTION

It is an object to provide a clutch system for a torque transmission which is cost-effective, can be manufactured with a small size, is easy to operate and/or is durable. Alternatively, or additionally, it is an object to provide a clutch system for a torque transmission which can be operated under load, e.g. while pedaling. Alternatively, or additionally, it is an object to provide a clutch system for a torque transmission which can be operated for coupling and for decoupling under load, e.g. while pedaling. Alternatively, or additionally, it is an object to provide a clutch system for a torque transmission which can be operated both for upshifting and for downshifting under load, e.g. while pedaling. More in general it is an object to provide an improved clutch system for a torque transmission, or at least an alternative clutch system for a torque transmission.

According to an aspect is provided a clutch system for a torque transmission. Such clutch system can be used in a vehicle, such as a bicycle or car, a windmill, or the like. The clutch system has an input arranged for connection to a drive source, and an output arranged for connection to a load. Preferably, the clutch system is operable under load between the input and the output. More preferably, the clutch system is operable under load between the input and the output both when coupling and when decoupling. Preferably, the clutch system is operable under load between the input and the output both during upshift and downshift of the torque transmission. The clutch system includes a first rotatable unit, e.g. a housing, connectable to the input. The clutch system includes a second rotatable unit connectable to the output. It is also possible that the first rotatable unit is connectable to the output and the second rotatable unit is connectable to the input. The first rotatable unit includes at least one first abutment surface. The second rotatable unit includes at least one second abutment surface arranged for selectively engaging the first abutment surface. The first and second abutment surfaces are adapted to each other so as to allow disengaging under load, e.g. so as to disengage under load. The clutch system includes a third rotatable unit. The third rotatable unit can be arranged for co-rotating with the second rotatable unit. The third rotatable unit includes at least one retaining member. The third rotatable unit is arranged for selectively being in a first position or a second position relative to the second rotatable unit. It will be appreciated that the first position can be a first rotational and/or axial position, and the second position can be a second, different, rotational and/or axial position. The at least one retaining member in the first position locks the at least one second abutment surface in engagement with the at least one first abutment surface for rotationally coupling the second rotatable unit to the first rotatable unit. The at least one retaining member in the second position releases the at least one second abutment surface for disengagement of the at least one first abutment surface for decoupling the second rotatable unit from the first rotatable unit.

Hence, while the first and second abutment surfaces are adapted to each other so as to allow disengaging under load, or to disengage under load, the relative positioning of the second and third rotatable units can in the first position lock the at least one second abutment surface in engagement with the at least one first abutment surface, and in the second position release the at least one second abutment surface for disengagement of the at least one first abutment surface. Hence, in the first position, the second rotatable unit can be rotationally coupled to the first rotatable unit, and in the second position the second rotatable unit can be decoupled from the first rotatable unit. Thus a simple and efficient clutch system can be provided.

Optionally, the third rotatable unit is arranged for co-rotating with the second rotatable unit, and the system is arranged for temporarily changing rotation speed of the third rotatable unit relative to the second rotatable unit, e.g. by temporarily speeding up, braking or halting the second and/or third rotatable unit, for rotating from the first position to the second position, or from the second position to the first position.

Optionally, the clutch system includes an actuator for rotating the third rotatable unit and/or the second rotatable unit from the first position to the second position, and/or from the second position to the first position. The actuator can be triggerable from outside the clutch system, such as via a control unit. The actuator can e.g. be triggered by external means. The actuator can e.g. be triggered by electrical means or mechanical means. The actuator can e.g. be triggered by manual means such as a user operated button or lever. The actuator can e.g. be triggered by automatic means, such as a controller. The clutch system can include input means. The input means can be arranged for receiving a trigger for triggering the actuator. Triggering of the actuator can be independent of internal forces, torques and/or rotational speeds in the clutch system. Hence, the clutch system can be operated under control of a user or user device.

Optionally, the clutch system includes an actuator for rotating the third rotatable unit and/or the second rotatable unit from the first position to the second position, and/or from the second position to the first position.

According to an aspect is provided a clutch system for a torque transmission. Such clutch system can be used in a vehicle, such as a bicycle or car, a windmill, or the like. The clutch system has an input arranged for connection to a drive source, and an output arranged for connection to a load. Preferably, the clutch system is operable under load between the input and the output. More preferably, the clutch system is operable under load between the input and the output both when coupling and when decoupling. Preferably, the clutch system is operable under load between the input and the output both during upshift and downshift of the torque transmission. The clutch system includes a first rotatable unit, e.g. a housing, connectable to the input. The clutch system includes a second rotatable unit connectable to the output. It is also possible that the first rotatable unit is connectable to the output and the second rotatable unit is connectable to the input. The clutch system includes a third rotatable unit arranged for co-rotating with the second rotatable unit. The third rotatable unit is arranged for selectively being in a first rotational position or a second rotational position relative to the second rotatable unit. The system is arranged for selectively in the first rotational position rotationally coupling the second rotatable unit to the first rotatable unit, and in the second rotational position decoupling the second rotatable unit from the first rotatable unit. The system is arranged for temporarily changing rotation speed of the third rotatable unit relative to the second rotatable unit, e.g. by temporarily speeding up, braking or halting the second and/or third rotatable unit, for rotating from the first position to the second position, or from the second position to the first position. Hence, the second and third rotatable units can in a simple manner be rotated from the first position to the second position or vice versa.

Optionally, the first rotatable unit includes at least one first abutment surface, and the second rotatable unit includes at least one second abutment surface arranged for selectively engaging the first abutment surface. The third rotatable unit in the first position locks the at least one second abutment surface in engagement with the at least one first abutment surface for rotationally coupling the second rotatable unit to the first rotatable unit, and in the second position releases the at least one second abutment surface for disengagement of the at least one first abutment surface for decoupling the second rotatable unit from the first rotatable unit.

Optionally, the third rotatable unit is rotatable relative to the second rotatable unit. Optionally a rotation angle of the third rotatable unit relative to the second rotatable unit is more than 360 degrees. Optionally a rotation angle of the third rotatable unit relative to the second rotatable unit is unlimited. The clutch system can be free from stop means limiting the rotation angle of the third rotatable unit relative to the second rotatable unit.

Optionally, the third rotatable unit is arranged to be rotated relative to the second rotatable unit from the first position to the second position, and from the second position to the first position in one and the same rotational direction. The third rotatable unit can be rotated relative to the second rotatable unit in a continued forward rotation for being moved from the first position to the second position, and from the second position to the first position. The third rotatable unit can be rotated relative to the second rotatable unit in a continued rearward rotation for being moved from the first position to the second position, and from the second position to the first position.

Optionally, the third rotatable unit is arranged for selectively being in one of a plurality of first or second positions relative to the second rotatable unit. The third rotatable unit in each of the first positions of the plurality of first positions locks the at least one second abutment surface in engagement with the at least one first abutment surface for rotationally coupling the second rotatable unit to the first rotatable unit. The third rotatable unit in each of the second positions of the plurality of second positions releases the at least one second abutment surface for disengagement of the at least one first abutment surface for decoupling the second rotatable unit from the first rotatable unit. The third rotatable unit can be arranged to be rotated relative to the second rotatable unit from a first first position to a first second position, and from the first second position to a second first position in one and the same rotational direction. The third rotatable unit can be arranged to be rotated relative to the second rotatable unit from the second first position to a second second position, and from the second second position to a third first position (or to a third first position) in the same one and the same rotational direction. The first positions of the plurality of first positions can e.g. be equally spaced around the perimeter of the second rotatable unit. The second positions of the plurality of second positions can e.g. be equally spaced around the perimeter of the second rotatable unit. The first positions and second positions can be alternatingly and preferably equally spaced around the perimeter of the second rotatable unit. For example, three first positions and three second positions are alternatingly spaced at 60 degrees around the perimeter of the second rotatable unit.

Optionally, the second and third rotatable units are free from biasing force relative to each other, such that the third rotatable unit is not forced into a first or second position relative to the second rotatable unit by a force, such as a spring force.

Optionally, the engagement or disengagement of the second abutment surface with the at least one first abutment surface is independent of input torque and/or rotation speed, but relies only on the second and third rotatable units being in the first or second relative positions.

Optionally, the at least one second abutment surface of the second rotatable unit is hingedly connected to the remainder of the second rotatable unit. Optionally, the at least one second abutment surface of the second rotatable unit is hingedly connected to the remainder of the second rotatable unit so as to have a single pivot axis.

Optionally, the third rotatable unit includes at least one, e.g. as at least two, actuation member arranged for moving the third rotatable unit from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit.

Optionally, the clutch system further includes a, e.g. non-rotatable, fourth unit. The fourth unit includes a selector. The selector is arranged for selectively being in a gripping or non-gripping mode. The selector in the gripping mode is arranged for gripping the at least one actuation member for rotating the third rotatable unit from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit. The selector in the non-gripping mode is arranged for not engaging the at least one actuation member. The selector in the non-gripping mode can allow the third rotatable unit to freely rotate with the second rotatable unit.

According to an aspect is provided a clutch system for a torque transmission. Such clutch system can be used in a vehicle, such as a bicycle or car, a windmill, or the like. The clutch system has an input arranged for connection to a drive source, and an output arranged for connection to a load. Preferably, the clutch system is operable under load between the input and the output. More preferably, the clutch system is operable under load between the input and the output both when coupling and when decoupling. Preferably, the clutch system is operable under load between the input and the output both during upshift and downshift of the torque transmission. The clutch system includes a first rotatable unit, e.g. a housing, connectable to the input. The clutch system includes a second rotatable unit connectable to the output. It is also possible that the first rotatable unit is connectable to the output and the second rotatable unit is connectable to the input. The clutch system includes a third rotatable unit arranged for co-rotating with the second rotatable unit. The third rotatable unit is arranged for selectively being in a first rotational position or a second rotational position relative to the second rotatable unit. The system is arranged for selectively in the first rotational position rotationally coupling the second rotatable unit to the first rotatable unit, and in the second rotational position decoupling the second rotatable unit from the first rotatable unit. The third rotatable unit includes at least one, e.g. as at least two, actuation member arranged for moving the third rotatable unit from a first position (e.g. the first position or a first position of a plurality of first positions) to a second position (e.g. the second position or a second position of a plurality of second positions) or from a second position (e.g. the second position or a second position of the plurality of second positions) to a first position (e.g. the first position or a first position of the plurality of first positions) relative to the second rotatable unit. The clutch system includes a, e.g. non-rotatable, fourth unit. The fourth unit includes a selector. The selector is arranged for selectively being in a gripping or non-gripping mode. The selector in the gripping mode is arranged for gripping the at least one actuation member for rotating the third rotatable unit from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit. The selector in the non-gripping mode is arranged for not engaging the at least one actuation member. The selector in the non-gripping mode can allow the third rotatable unit to freely rotate with the second rotatable unit.

Optionally, the first rotatable unit includes at least one first abutment surface, and the second rotatable unit includes at least one second abutment surface arranged for selectively engaging the first abutment surface. The third rotatable unit includes at least one retaining member arranged for in a first position locking the at least one second abutment surface in engagement with the at least one first abutment surface for rotationally coupling the second rotatable unit to the first rotatable unit, and in a second position releasing the at least one second abutment surface for disengagement of the at least one first abutment surface for decoupling the second rotatable unit from the first rotatable unit. Optionally, the actuation member is biased into contact with the selector, e.g. by spring force.

Optionally, the third rotatable unit includes a first body and a second body, wherein the first body includes the at least one retaining member, and the second body includes the at least one actuation member. Optionally, the third rotatable unit includes at least two actuation members, and the second body includes at least one of the actuation members, e.g. all of the actuation members.

Optionally, the first body is rotationally resiliently coupled to the second body, e.g. by means of a spring.

Optionally, the second rotatable unit includes a retractor member arranged for moving the at least one actuation member out of engagement with the selector.

Optionally, the selector includes a groove including a first partial groove and a second partial groove. In gripping mode the partial grooves allow, e.g. align for, engaging the at least one actuation member. In non-gripping mode the partial grooves allow, e.g. are out of alignment for, preventing engagement of the at least one actuation member.

Optionally, the third rotatable body includes two actuation members, optionally arranged such that when the first actuation member is biased into contact with the selector, the second actuation member is maintained at a distance from, e.g. non-engaged by, the selector and vice versa. Optionally, the selector is arranged to be in a first mode or in a second mode. In the first mode the selector is in gripping mode for the first actuation member and in non-gripping mode for the second actuation member. In the second mode the selector is in non-gripping mode for the first actuation member and in gripping mode for the second actuation member.

Optionally, the selector includes a groove including a first partial groove, a second partial groove and a third partial groove. In the first mode the first and second partial grooves allow, e.g. align for, gripping the first actuation member and optionally for not engaging the second actuation member, and in the second mode the second and third grooves allow, e.g. align for, gripping the second actuation member and optionally for not engaging the first actuation member.

Optionally, the first partial groove, the second partial groove and the third partial groove extend on a cylindrical surface of the fourth unit in a direction substantially parallel to an axis of the cylindrical surface.

Optionally, the second partial groove and the third partial groove are arranged to be moved, e.g. relative to the first partial groove, e.g. displaced tangentially. Optionally, the second and third partial groove are arranged to be moved, e.g. simultaneously, in opposite directions.

Optionally, the second partial groove is arranged for moving in the same direction as the first actuation member when the second partial groove moves from the non-gripping mode to the gripping mode for the first actuation member, and the third partial groove is arranged for moving in the same direction as the second actuation member when the third partial groove moves from the non-gripping mode to the gripping mode for the second actuation member.

Hence, forces on the selector are minimized, and symmetrical for both actuation members.

Optionally, the at least one second abutment surface is a gripping member arranged for radially moving, e.g. pivoting, in and out of engagement with the at least one first abutment surface.

Optionally, the at least one actuation member is arranged for radially moving, e.g. pivoting, in and out of engagement with the fourth unit.

Optionally, the first and/or second abutment surface is biased to disengage. Hence the default for the first and second abutment surfaces is a disengaged mode. The relative position of the third and second rotatable units then determined whether or not the first and second abutment surfaces are engaged or disengaged.

Optionally, the clutch system includes a plurality of first and/or second abutment surfaces, e.g. distributed along a perimeter of the first and/or second rotatable units, respectively. Optionally, the first and/or second abutment surfaces are distributed substantially uniformly along the perimeter of the first and/or second rotatable units, respectively. Optionally the number of first abutment surfaces is equal to the number of second abutment surfaces.

Optionally, the clutch system includes a plurality of retaining members.

Optionally, the first, second, third, and/or fourth unit are coaxial. Optionally, the fourth unit is positioned at least partially within the third rotatable unit, and/or the third rotatable unit is at least partially positioned within the second rotatable unit, and/or the second rotatable unit is at least partially positioned within the first rotatable unit.

According to an aspect is provided a torque transmission, including a clutch system as described herein and a planetary gear. The clutch system can be arranged in the torque transmission so as to selectively couple two of the sun gear, the planet carrier and the ring gear of the planetary gear. Optionally, The clutch system is arranged in the torque transmission so as to selectively couple the planet carrier and the ring gear.

According to an aspect is provided a wheel axle assembly, such as a bicycle wheel axle assembly, including the torque transmission. The wheel axle assembly can be arranged for receiving a cassette having a plurality of gear wheels.

According to an aspect is provided a bicycle wheel hub including a clutch system as described herein. The bicycle wheel hub can include a torque transmission, as described. Optionally, the wheel hub is arranged for receiving a cassette having a plurality of gear wheels.

According to an aspect is provided a bicycle including a clutch system as described herein. The bicycle can include a torque transmission, including a clutch system as described herein and a planetary gear. The clutch system can be arranged in the torque transmission so as to selectively couple two of the sun gear, the planet carrier and the ring gear. Optionally, The clutch system is arranged in the torque transmission so as to selectively couple the planet carrier and the ring gear. Optionally, the torque transmission is included in a rear wheel hub of the bicycle. Optionally, a rear cassette having a plurality of gear wheels is attached to the rear wheel hub. The bicycle can include a rear derailleur for selecting one of the plurality of gear wheels of the rear pinion. Optionally, the bicycle includes one single front pinion. In such case, the torque transmission can emulate functioning of a front derailleur.

According to an aspect is provided a method for operating a clutch system for a torque transmission. Such method can be practiced in a vehicle, such as a bicycle or car, a windmill or the like. The clutch system has an input arranged for connection to a drive source, and an output arranged for connection to a load. Preferably, the clutch system is operable under load between the input and the output. More preferably, the clutch system is operable under load between the input and the output both when coupling and when decoupling. Preferably, the clutch system is operable under load between the input and the output both during upshift and downshift of the torque transmission. The method includes providing a clutch system. The clutch system includes a first rotatable unit, e.g. a housing, connectable to the input. The clutch system includes a second rotatable unit connectable to the output. It is also possible that the first rotatable unit is connectable to the output and the second rotatable unit is connectable to the input. The first rotatable unit includes at least one first abutment surface. The second rotatable unit includes at least one second abutment surface arranged for selectively engaging the first abutment surface. The first and second abutment surfaces are adapted to each other so as to allow disengaging under load, e.g. so as to disengage under load. The clutch system includes a third rotatable unit. The third rotatable unit can be arranged for co-rotating with the second rotatable unit. The third rotatable unit includes at least one retaining member. The third rotatable unit is arranged for selectively being in a first positon or a second position relative to the second rotatable unit. It will be appreciated that the first position can be a first rotational and/or axial position, and the second position can be a second, different, rotational and/or axial position. The third rotatable unit in the first position locks the at least one second abutment surface in engagement with the at least one first abutment surface for rotationally coupling the second rotatable unit to the first rotatable unit. The third rotatable unit in the second position releases the at least one second abutment surface for disengagement of the at least one first abutment surface for decoupling the second rotatable unit from the first rotatable unit. The method includes rotating the third rotatable unit relative to the second rotatable unit from a first position to a second position for disengaging the clutch system, and rotating the third rotatable unit relative to the second rotatable unit from a second position to a first position for engaging the clutch system.

Optionally, the method includes having the third rotatable unit co-rotate with the second rotatable unit, and temporarily changing rotation speed of the third rotatable unit relative to the second rotatable unit, e.g. by temporarily speeding up, braking or halting the second and/or third rotatable unit, for rotating the third rotatable unit from the first position to the second position, or from the second position to the first position, relative to the second rotatable unit.

Optionally, the method includes automatically resuming co-rotation of the third rotatable unit with the second rotatable unit after the third rotatable unit has been rotated from the first rotational position to the second rotational position or vice versa.

According to an aspect is provided a method for operating a clutch system for a torque transmission. Such method can be practiced in a vehicle, such as a bicycle or car, a windmill or the like. The clutch system has an input arranged for connection to a drive source, and an output arranged for connection to a load. Preferably, the clutch system is operable under load between the input and the output. More preferably, the clutch system is operable under load between the input and the output both when coupling and when decoupling. Preferably, the clutch system is operable under load between the input and the output both during upshift and downshift of the torque transmission. The method includes providing a clutch system. The clutch system includes a first rotatable unit, e.g. a housing, connectable to the input. The clutch system includes a second rotatable unit connectable to the output. It is also possible that the first rotatable unit is connectable to the output and the second rotatable unit is connectable to the input. The clutch system includes a third rotatable unit arranged for co-rotating with the second rotatable unit. The third rotatable unit is arranged for selectively being in a first rotational positon or a second rotational position relative to the second rotatable unit. The system is arranged for selectively in the first rotational position rotationally coupling the second rotatable unit to the first rotatable unit, and in the second rotational position decoupling the second rotatable unit from the first rotatable unit. The method includes temporarily changing rotation speed of the third rotatable unit relative to the second rotatable unit, e.g. by temporarily speeding up, braking or halting the second and/or third rotatable unit, for rotating the third rotatable unit from the first position to the second position, or from the second position to the first position, relative to the second rotatable unit.

Optionally, the method includes rotating the third rotatable unit from the first position to the second position and from the second position to the first position in one and the same rotational direction.

Optionally, third rotatable unit includes at least one, such as at least two, actuation member arranged for moving the third rotatable unit from the first position to the second position or from the second position to the first position relative to the second rotatable unit, and the clutch system includes a, e.g. non-rotatable, fourth unit including a selector, the selector being arranged for selectively being in a gripping or non-gripping mode, and the method includes with the selector in the gripping mode gripping the at least one actuation member for rotating the third rotatable unit from the first position to the second position or from the second position to the first position relative to the second rotatable unit, and with the selector in the non-gripping mode not engaging the at least one actuation member. The selector in the non-gripping mode can allowing the third rotatable unit to freely rotate with the second rotatable unit.

According to an aspect is provided a method for operating a clutch system for a torque transmission. Such method can be practiced in a vehicle, such as a bicycle or car, a windmill or the like. The clutch system has an input arranged for connection to a drive source, and an output arranged for connection to a load. Preferably, the clutch system is operable under load between the input and the output. More preferably, the clutch system is operable under load between the input and the output both when coupling and when decoupling. Preferably, the clutch system is operable under load between the input and the output both during upshift and downshift of the torque transmission. The method includes providing a clutch system. The clutch system includes a first rotatable unit, e.g. a housing, connectable to the input. The clutch system includes a second rotatable unit connectable to the output. It is also possible that the first rotatable unit is connectable to the output and the second rotatable unit is connectable to the input. The clutch system includes a third rotatable unit arranged for co-rotating with the second rotatable unit. The third rotatable unit is arranged for selectively being in a first rotational positon or a second rotational position relative to the second rotatable unit. The system is arranged for selectively in the first rotational position rotationally coupling the second rotatable unit to the first rotatable unit, and in the second rotational position decoupling the second rotatable unit from the first rotatable unit. The third rotatable unit includes at least one, e.g. as at least two, actuation member arranged for moving the third rotatable unit from a first position (e.g. the first position or a first position of a plurality of first positions) to a second position (e.g. the second position or a second position of a plurality of second positions) or from a second position (e.g. the second position or a second position of the plurality of second positions) to a first position (e.g. the first position or a first position of the plurality of first positions) relative to the second rotatable unit. The clutch system includes a, e.g. non-rotatable, fourth unit. The fourth unit includes a selector. The selector is arranged for selectively being in a gripping or non-gripping mode. The method includes with the selector in the gripping mode gripping the at least one actuation member for rotating the third rotatable unit from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit; and with the selector in the non-gripping mode not engaging the at least one actuation member. The selector in the non-gripping mode can allow the third rotatable unit to freely rotate with the second rotatable unit.

Optionally, the first rotatable unit includes at least one first abutment surface, and the second rotatable unit includes at least one second abutment surface arranged for selectively engaging the first abutment surface, and the third rotatable unit includes at least one retaining member, and the method includes in the first position locking the at least one second abutment surface in engagement with the at least one first abutment surface for rotationally coupling the second rotatable unit to the first rotatable unit, and in the second position releasing the at least one second abutment surface for disengagement of the at least one first abutment surface for decoupling the second rotatable unit from the first rotatable unit.

Optionally, the actuation member is biased into contact with the selector.

Optionally, the method includes, e.g. actively, moving the at least one actuation member out of engagement with the selector after the third rotatable unit has been rotated from the first position to the second position, or from the second position to the first position.

Optionally, the selector includes a groove including a first partial groove and a second partial groove, and the method includes in gripping mode allowing, e.g. aligning, the partial grooves to engage the at least one actuation member, and in non-gripping mode allowing, e.g. dis-aligning, the partial grooves to prevent engagement of the at least one actuation member.

Optionally, the third rotatable unit includes two actuation members, optionally arranged such that when the first actuation member is in contact with the selector, the second actuation member maintained at a distance from the selector and vice versa, and the method includes selectively setting the selector in a first mode or in a second mode, wherein in the first mode the selector is in gripping mode for the first actuation member and in non-gripping mode for the second actuation member, and in the second mode the selector is in non-gripping mode for the first actuation member and in gripping mode for the second actuation member.

Optionally, the selector includes a groove including a first partial groove, a second partial groove and a third partial groove, wherein in the first mode the first and second partial grooves allow, e.g. align for, gripping the first actuation member and optionally not engaging the second actuation member, and in the second mode the second and third grooves allow, e.g. align for, gripping the second actuation member and optionally not engaging the first actuation member.

Optionally, the method includes moving the second and third partial grooves, e.g. simultaneously, in opposite directions.

Optionally, the method includes moving the second partial groove in the same direction as the first actuation member when the second partial groove moves from the non-gripping mode to the gripping mode for the first actuation member, and moving the third partial groove in the same direction as the second actuation member when the third partial groove moves from the non-gripping mode to the gripping mode for the second actuation member.

It will be appreciated that any one or more of the above aspects, features and options can be combined. It will be appreciated that any one of the options described in view of one of the aspects can be applied equally to any of the other aspects. It will also be clear that all aspects, features and options described in view of the clutch system apply equally to the method, and vice versa.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
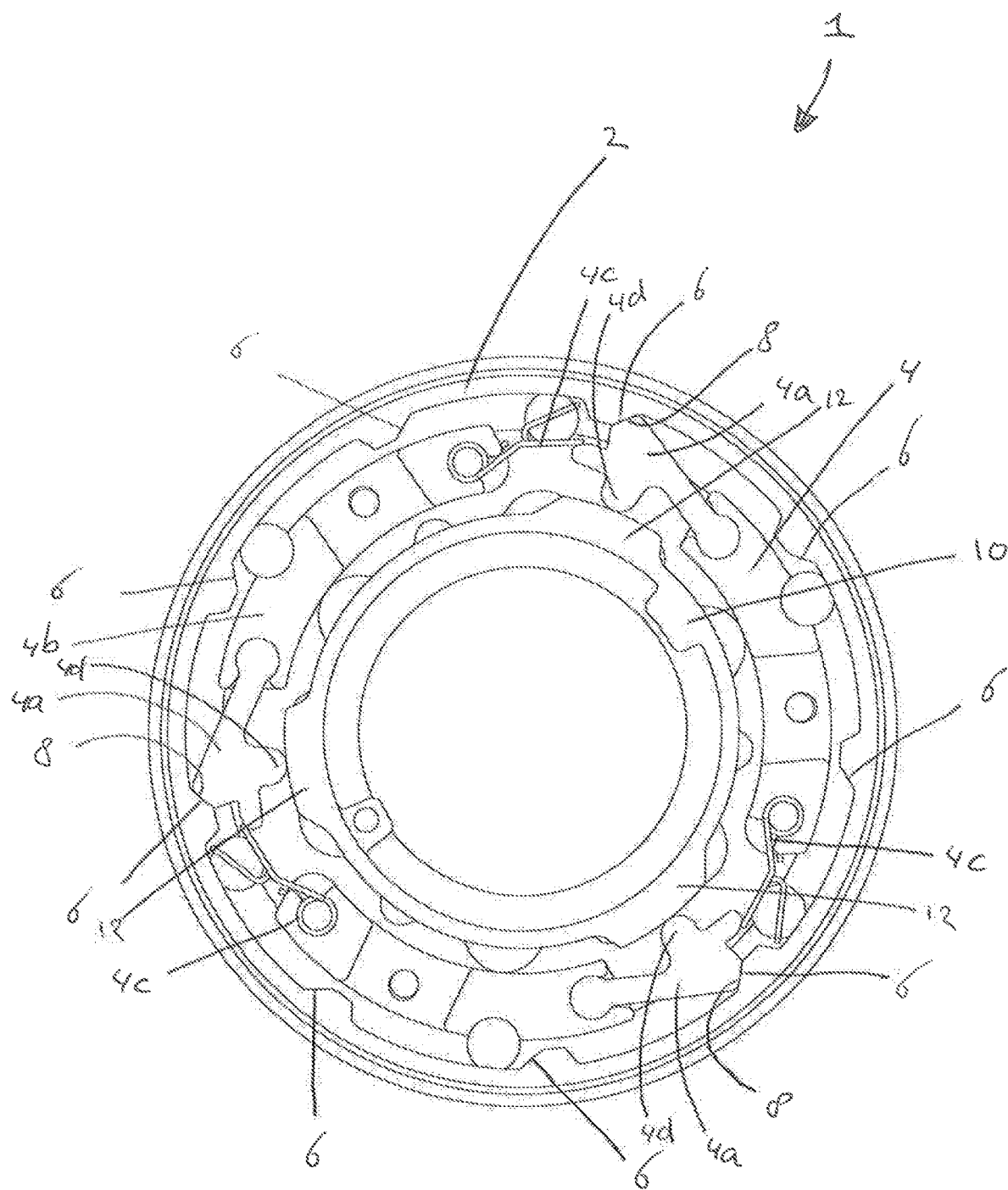
FIG. 1 shows an example of a clutch system.
Figure 2:
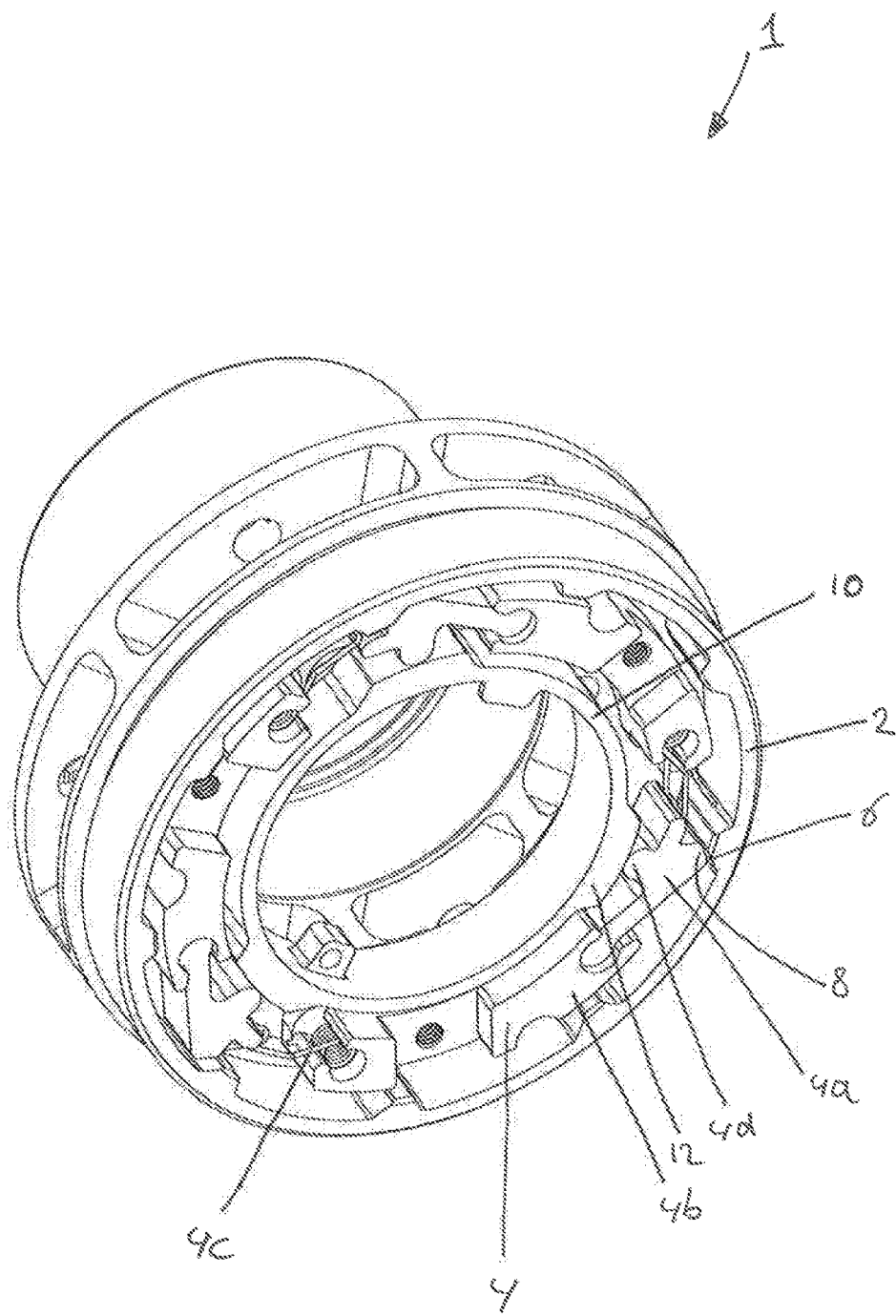
FIG. 2 shows an example of a clutch system.
Figure 3:
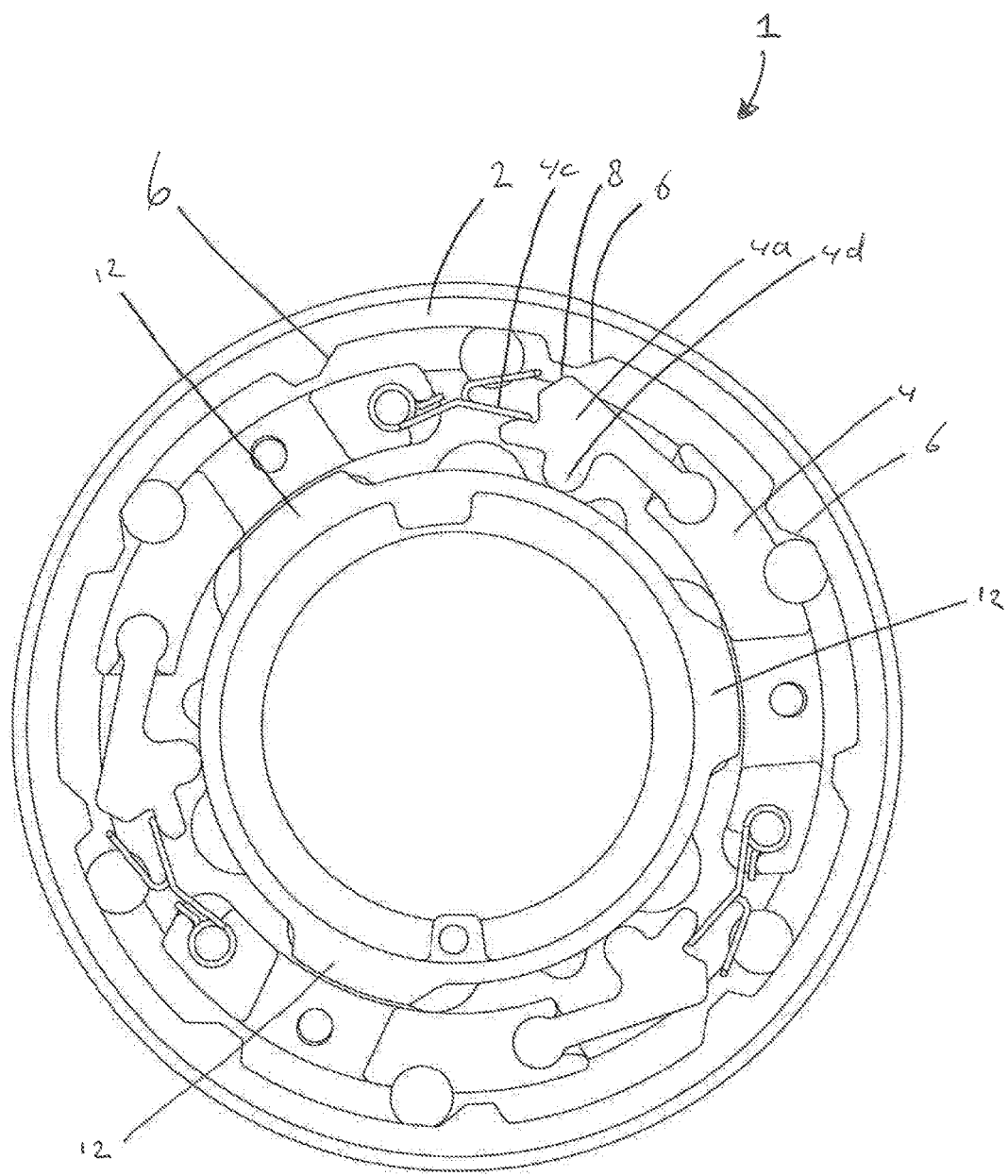
FIG. 3 shows an example of a clutch system.

FIGS. 1, 2 and 3 show an example of a clutch system 1. The clutch system 1 of this example is for use in a torque transmission of a bicycle, however, other fields of use can be envisioned. The clutch system 1 has an input arranged for connection to a drive source, such as pedals or a chain/belt. The clutch system has an output arranged for connection to a load, such as a rear wheel hub. The exemplary clutch system 1 is operable under load between the input and the output, e.g. while pedaling. Hence, the clutch system 1 can be coupled or decoupled under load. Here, the clutch system is operable under load between the input and the output both during upshift and downshift of the torque transmission.

The clutch system in FIGS. 1, 2 and 3 includes a first rotatable unit 2. The first rotatable unit 2 is arranged to be connected to the input. Here, the first rotatable unit 2 is designed as a housing part of the clutch system 1. The clutch system 1 includes a second rotatable unit 4. The second rotatable unit 4 is arranged to be connected to the output. The first rotatable unit 2 includes at least one first abutment surface 6. In this example, the first rotatable unit 2 includes nine first abutment surfaces 6, here evenly distributed along the perimeter of the first rotatable unit 2 at 40 degrees mutual spacing. The second rotatable unit 4 includes at least one second abutment surface 8. In this example, the second rotatable unit 4 includes three second abutment surfaces 8, here evenly distributed along the perimeter of the second rotatable unit 4 at 120 degrees mutual spacing. It will be appreciated that in this example the second rotatable unit 4 includes a plurality of gripping members 4a, here embodied as separate parts hingedly connected to a body portion 4b of the second rotatable unit 4. In this example, the second abutments surfaces 8 are part of the gripping members 4a of the second rotatable unit 4. The second abutment surfaces 8, here the gripping members 4a, are each arranged for selectively engaging one of the first abutment surfaces 6. In the example of FIG. 1 it can be seen that the first and second abutment surfaces are oriented at an angle relative to a radial direction of the first and second rotatable units, respectively. This allows the first and second abutment surfaces are to disengaging under load. In this example, the second rotatable unit 4 includes resilient members 4c, here helical springs, arranged so as to bias the second abutment surfaces 8 out of engagement with the first abutment surfaces 6.

The clutch system 1 in FIGS. 1, 2 and 3 includes a third rotatable unit 10. The third rotatable unit 10 is arranged for co-rotating with the second rotatable unit 4. That is, in use, when the output is rotating (e.g. when the driven wheel of the bicycle is rotating), i.e. when the second rotatable unit 4 is rotating, the third rotatable unit 10 generally co-rotates with the second rotatable unit 4.

The third rotatable unit 10 includes at least one retaining member 12. In this example, the third rotatable unit 10 includes three retaining members 12, here evenly distributed along the perimeter of the third rotatable unit 10 at 120 degrees mutual spacing. The third rotatable unit 10 is arranged for selectively being in a first position (see FIG. 1) or a second position (see FIG. 3) relative to the second rotatable unit 4. It will be appreciated that in this example the first position is a first rotational position, and the second position is a second, different, rotational position.

In the first position (shown in FIG. 1), the retaining members 12 are positioned rotationally aligned with, here under, cams 4d of the gripping members 4a. Thus, in the first position, the gripping members 4a are forced to be pivoted in a radially outer position. In the first position, the second abutment surfaces 8 are positioned to be touching or close to the first abutment surfaces 6. The presence of the retaining members 12 under the cams 4a prevents the second abutment surfaces from being pivoted radially inwards sufficiently to disengage from the first abutment surfaces 6. Hence, the retaining members 12 in the first position lock the second abutment surfaces 8 in engagement with the first abutment surfaces 6. As the second abutment surfaces 8 are locked in engagement with the first abutment surfaces 6, the second rotatable unit 4 is rotationally coupled to the first rotatable unit 2.

In the second position (shown in FIG. 3), the retaining members 12 are positioned rotationally not aligned with, here out of the reach of, the cams 4d of the gripping members 4a. Thus, in the second position, the gripping members 4a are free to pivot to a radially inner position. In this example, the biasing force of the resilient members 4c pivots the second abutment surfaces 8 radially inwards sufficiently to disengage from the first abutment surfaces 6. As a result, the first rotatable unit 2 is free to rotate independently of the second rotatable unit 4. Thus, the second rotatable unit 4 is decoupled from the first rotatable unit 2.

Hence, while the first abutment surfaces 6 and second abutment surfaces 8 are adapted to each other so as to allow disengaging under load, or to disengage under load, the relative positioning of the second rotatable unit 4 and the third rotatable unit 10 can selectively in the first position lock the second abutment surfaces 8 in engagement with the first abutment surfaces 6, and in the second position release the second abutment surfaces 8 for disengagement from the first abutment surfaces 6. It will be appreciated that while the first rotatable unit 2 and second rotatable unit 4 are decoupled, rotating the third rotatable unit 10 from the first position to the second position relative to the second rotatable unit 4, will couple the first and second rotatable units. While the first rotatable unit 2 and second rotatable unit 4 are coupled, rotating the third rotatable unit 10 from the second position to the first position relative to the second rotatable unit 4, will decouple the first and second rotatable units.

Changing the position of the third rotatable unit 10 relative to the second rotatable unit 4 from the first position to the second position, or vice versa, can be performed in many different ways. Changing the position of the third rotatable unit 10 relative to the second rotatable unit 4 from the first position to the second position can be performed by rotating the third rotatable unit 10 relative to the second rotatable unit 4 in a forward direction, and changing the position of the third rotatable unit 10 relative to the second rotatable unit 4 from the second position to the first position can be performed by rotating the third rotatable unit 10 relative to the second rotatable unit 4 in an opposite, rearward direction. It is also possible to rotate the third rotatable unit 10 relative to the second rotatable unit 4 from the first position to the second position, and from the second position to the first position in one and the same rotational direction.

An actuator can be provided for rotating the third rotatable unit and/or the second rotatable unit from the first position to the second position, and/or from the second position to the first position.

In the example of FIGS. 1, 2 and 3, the third rotatable unit 10 is arranged for co-rotating with the second rotatable unit 4. Therefore, changing the position of the third rotatable unit 10 relative to the second rotatable unit 4 from the first position to the second position, or vice versa, can be performed by temporarily changing rotation speed of the third rotatable unit relative to the second rotatable unit, e.g. by temporarily speeding up, braking or halting the second and/or third rotatable unit, for rotating from the first position to the second position, or from the second position to the first position.

In the example of FIGS. 1, 2 and 3, the third rotatable unit 10 is freely rotatable relative to the second rotatable unit 4. There is no limit to the rotational displacement of the third rotatable unit 10 relative to the second rotatable unit 4. In this example, the third rotatable unit 10 is arranged for selectively being in one of a plurality of first positions or one of a plurality of second positions relative to the second rotatable unit. Each of the first positions of the plurality of first positions is defined by the third rotatable unit 10 being positioned to lock the second abutment surfaces 8 in engagement with the first abutment surfaces 6 for rotationally coupling the second rotatable unit 4 to the first rotatable unit 2. In this example there are three gripping members 4a and three retaining members 12, so there are three distinct first positions. Here, the three first positions are evenly distributed along the perimeter of the second rotatable unit 4 at 120 degrees mutual spacing. Each of the second positions of the plurality of second positions is defined by the third rotatable unit 10 being positioned to release the second abutment surfaces 8 from engagement with the first abutment surfaces 6 for rotationally decoupling the second rotatable unit 4 from the first rotatable unit 2. In this example there are three gripping members 4a and three retaining members 12, so there are three second positions. Here, the three second positions can be seen as evenly distributed along the perimeter of the second rotatable unit 4 at 120 degrees mutual spacing. It will be appreciated that the three first positions and three second positions are alternatingly placed along the perimeter of the second rotatable unit 4. For example, the three first positions and three second positions are alternatingly spaced at 60 degrees around the perimeter of the second rotatable unit.

Here, the third rotatable unit 10 can be rotated relative to the second rotatable unit 4 from a first first position to a first second position, from the first second position to a second first position, from the second first position to a second second position, from the second second position to a third first position, from the third first position to a third second position, and from the third second position to the first first position in one and the same rotational direction. The clutch system 1 can be arranged for temporarily changing rotation speed of the third rotatable unit 10 relative to the second rotatable unit 4, e.g. by temporarily speeding up, braking or halting the second and/or third rotatable unit, for rotating from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions). Hence, the second and third rotatable units can in a simple manner be rotated from a first position to a second position or vice versa.

FIGS. 4a, 4b, 4c and 5 show an example of a mechanism for moving the third rotatable unit 10 from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit.

The third rotatable unit 10 includes at least one, here two, actuation member 10a arranged for moving the third rotatable unit 10 from a first position to a second position or from a second position to a first position relative to the second rotatable unit 4. The actuation members 10a are hingedly connected to a body portion 10b of the third rotatable unit 10. In this example, the body portion 10b of the third rotatable unit 10 includes an first body portion 10b1 and a second body portion 10b2. The first body portion 10b1 hingedly receives the actuation members 10a. The second body portion 10b2 includes the retaining members 12. The first body portion 10b1 is rotatable relative to the second body portion 10b2, here over an angular stroke S. The first and second body portions 10b1, 10b2 are biased in abutment with a resilient element 10c, here a tension spring. This allows the first and second body portions to rotate relative to each other. For example, when the retaining member 12 can not yet push the gripping member 4a radially outwardly in abutment with the first abutment surface 6 the resilient element 10c allows the first body portion 10b1 to rotate relative to the first rotatable unit 2 while the second body portion 10b2 does not rotate relative to the first rotatable unit 2.

In FIGS. 4a, 4b, 4c and 5 the clutch system 1 further includes a, here non-rotatable, fourth unit 16. The fourth unit 16 can be arranged to be non-rotatably mounted to a frame of the bicycle. The fourth unit 16 is further shown in FIGS. 6 and 7. The fourth unit 16 includes a selector 18. The selector 18 is arranged for selectively being in a gripping or non-gripping mode.

Figure 4A:
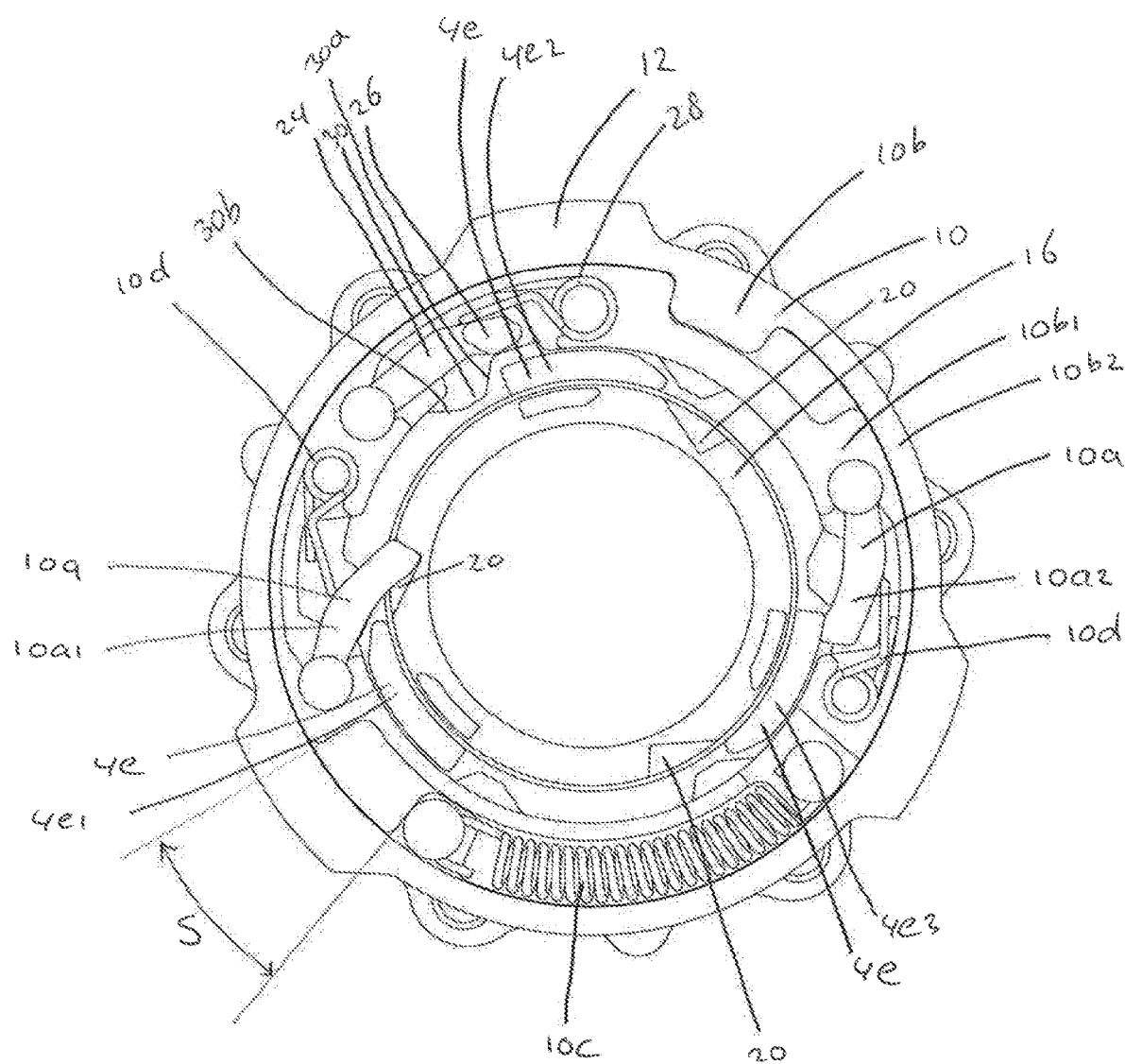
FIGS. 4a, 4b and 4c show an example of a clutch system.

As shown in FIGS. 4a-7, here the third rotatable body 10 includes two actuation members 10a. In this example, the actuation members 10a are biased towards the fourth unit 16 by resilient elements 10d, here helical springs. In this example, the second rotatable unit 4 includes three retractor members 4e. the retractor members 4e co-rotate with the body portion 4b of the second rotatable unit 4. The retractor members 4e can e.g. be fixedly connected to, or integral with, the body portion 4b. As can be seen in FIG. 4a, one of the retractor members 4e, here 4e1, allows a first actuation member 10a1 to engage the fourth unit 16, while another one of the retractor members 4e, here 4e3, prevents a second actuation member 10a2 to engage the fourth unit 16. Hence, when the first actuation member 10a1 is biased into contact with the selector 18, the second actuation member 10a2 is maintained at a distance from, e.g. non-engaged by, the selector 18, and vice versa.

Figure 4B:
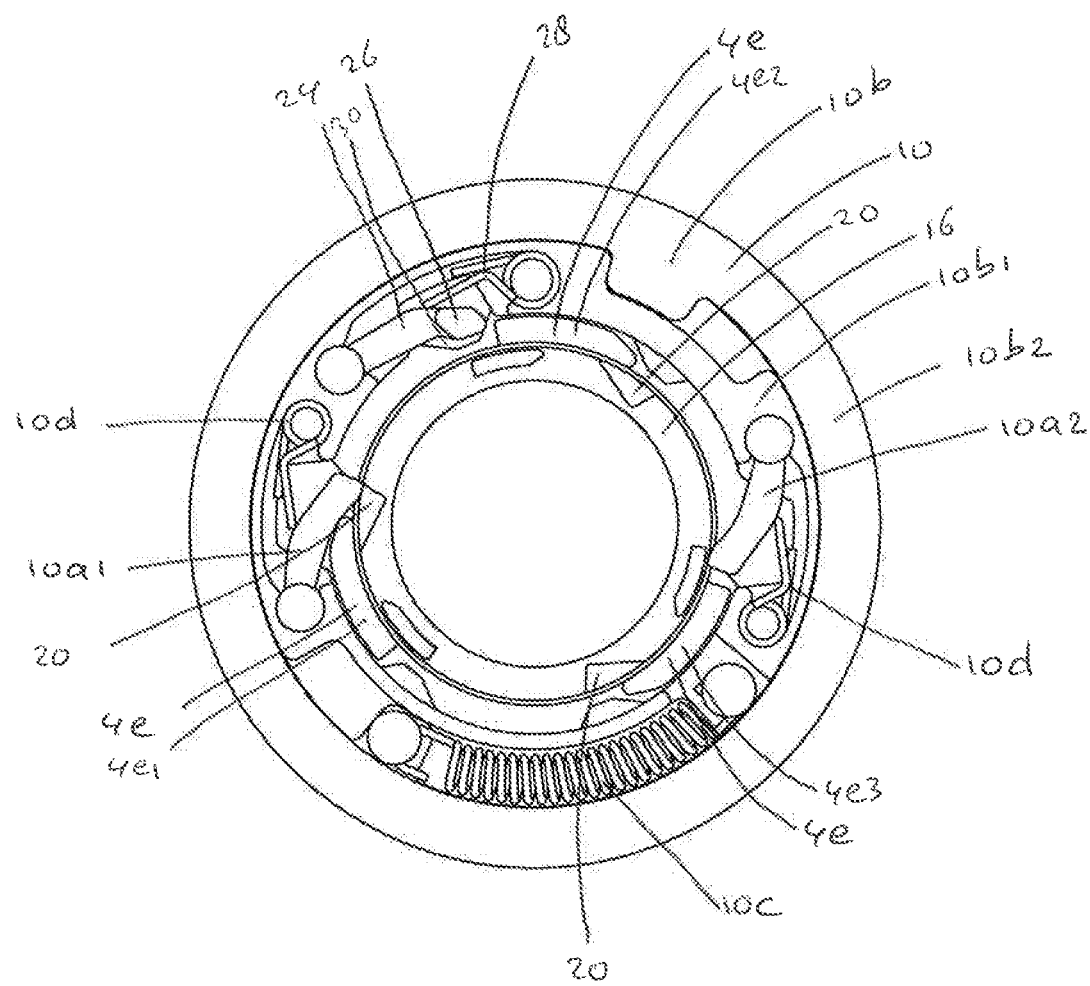
Figure 4C:
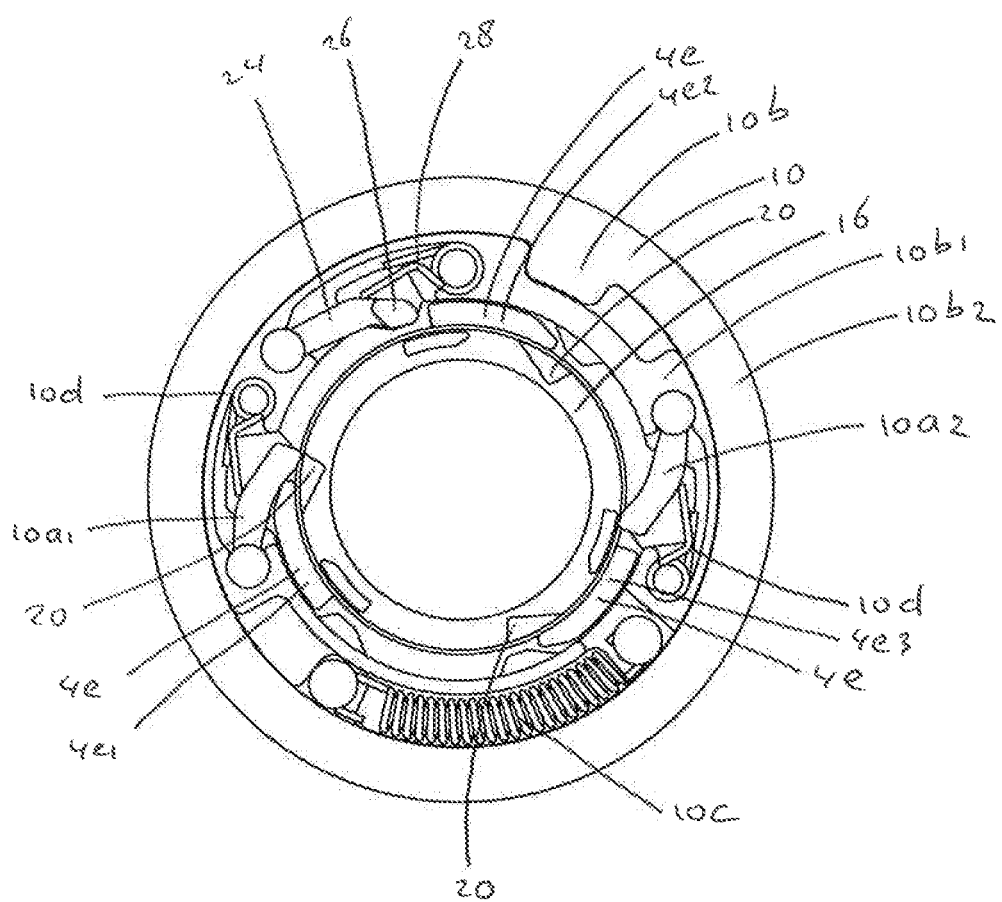
Figure 5:
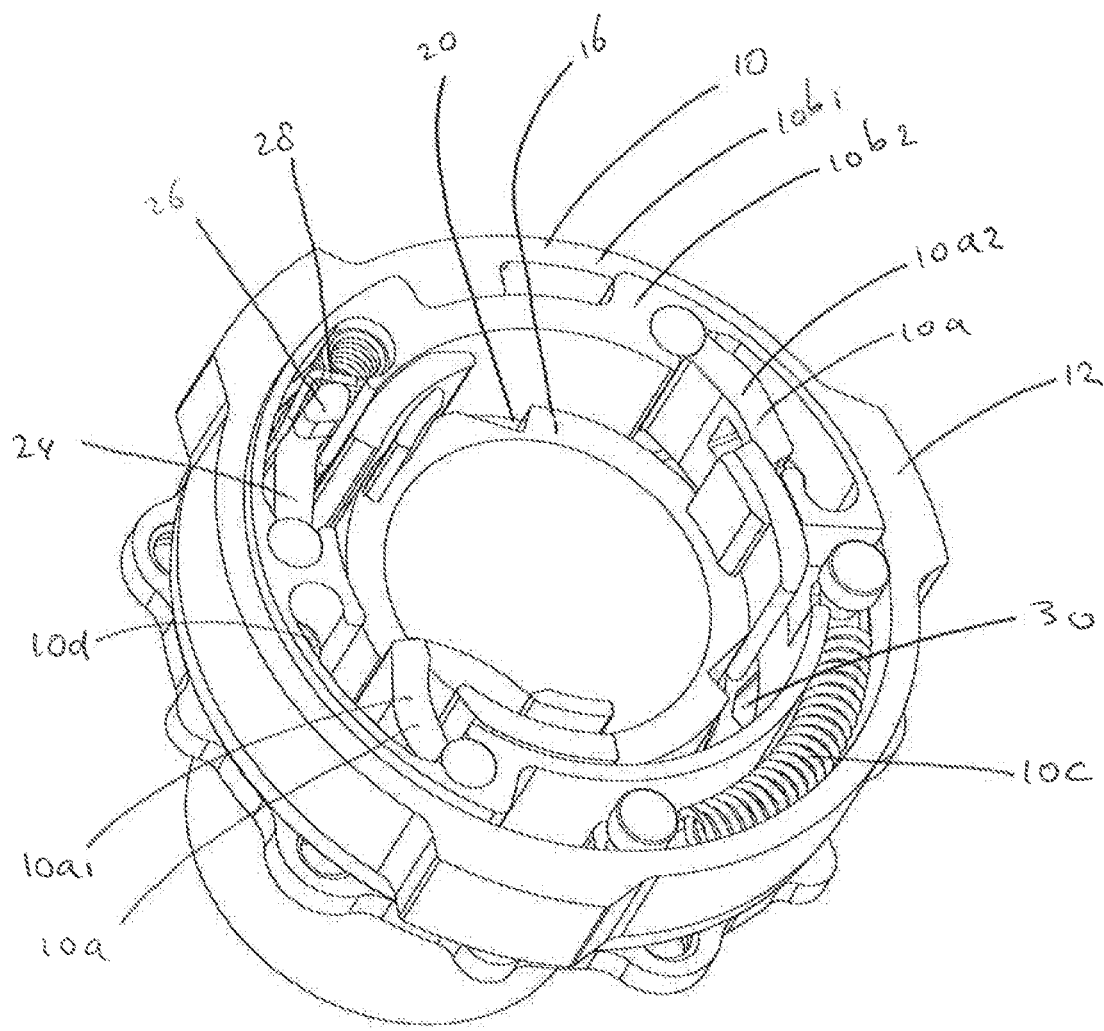
FIG. 5 shows an example of a clutch system.
Figure 6:
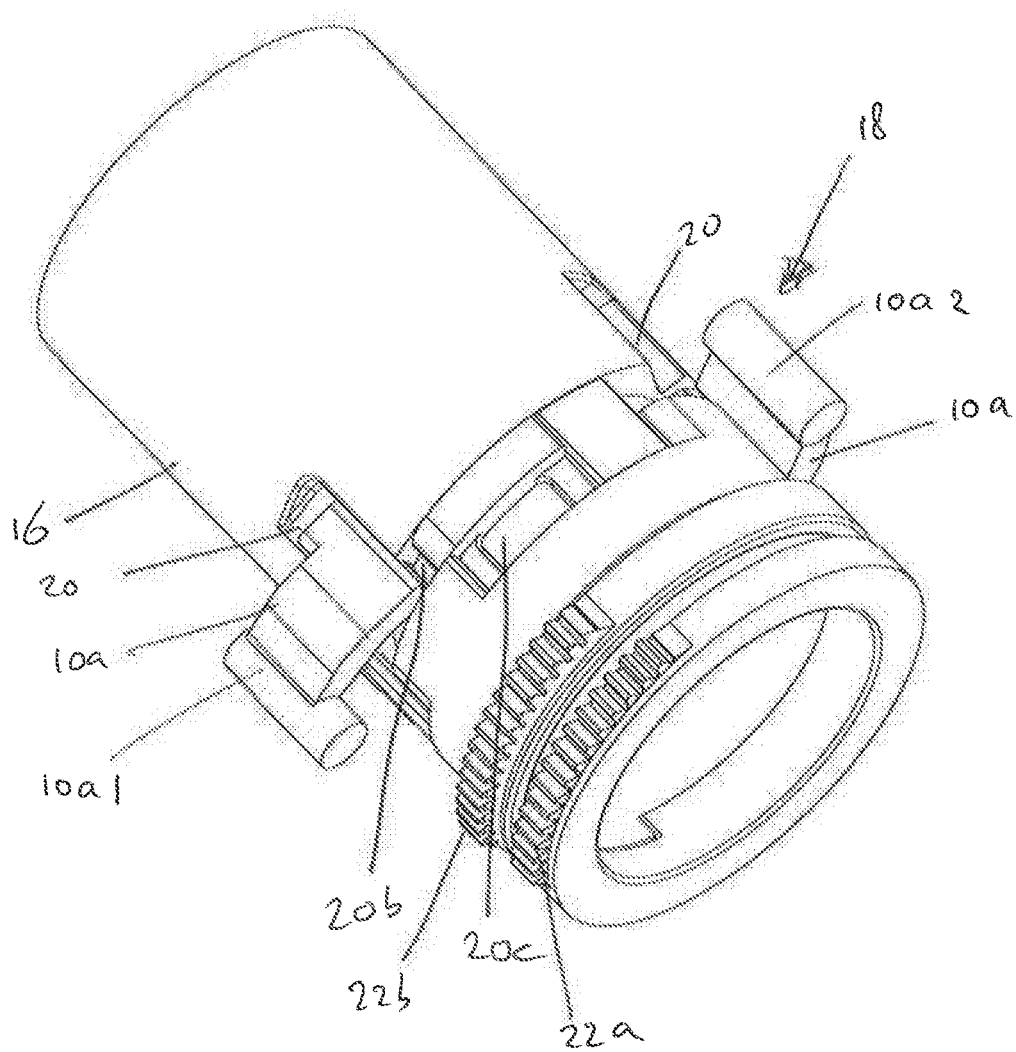
FIG. 6 shows an example of a clutch system.
Figure 7:
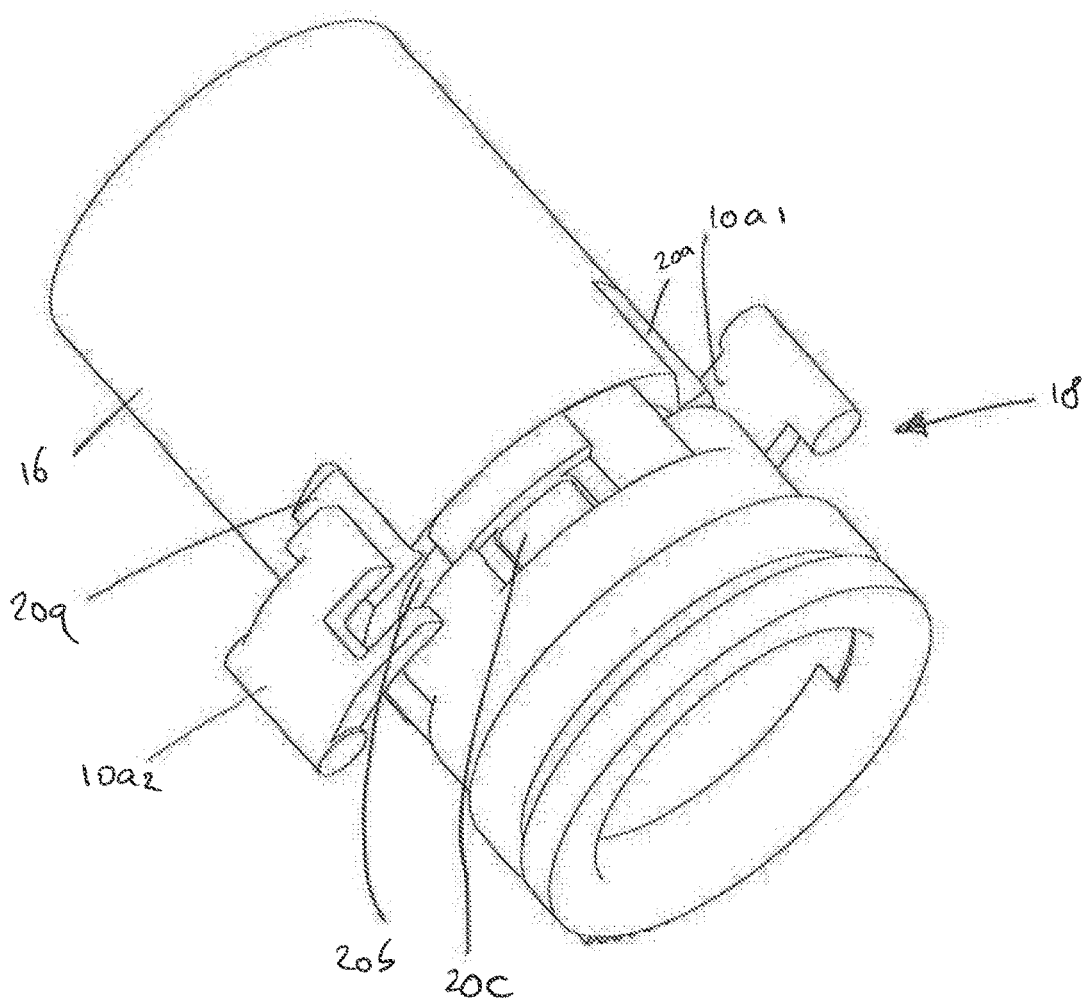
FIG. 7 shows an example of a clutch system.

As shown in FIGS. 6 and 7, in this example the selector 18 includes a groove 20. In this example, the groove 20 includes a first partial groove 20a, a second partial groove 20b and a third partial groove 20c. In a first mode the first partial groove 20a and second partial groove 20b align as shown in FIGS. 6 and 7. It is noted that in this first mode the third partial groove 20c does not align with the first partial groove 20a. In a second mode the first partial groove 20a and third partial groove 20c align. It is noted that in this second mode the second partial groove 20b does not align with the first partial groove 20a. As can be seen in FIG. 6, the first and second partial grooves 20a, 20b aligning, allows the first actuation member 10a1 to enter into the first partial groove 20a, as can also be seen in FIG. 4a. It will be noted that in this example the shape of the first actuation member 10a1, requires the first partial groove 20a and the second partial groove 20b to align for allowing the first actuation member 10a1 to enter the first partial groove 20a. The first partial groove 20a then supports the first actuation member 10a1, allowing a force to be guided from the fourth unit 16 via the first actuation member 10a1 to the third rotatable unit 10. As a result, the third rotatable unit 10 will be halted, and when, in use, the second rotatable unit 4 will remain rotating, the third rotatable unit 10 will be rotated relative to the second rotatable unit 4. When the second rotatable unit 4 has rotated over approximately 60 degrees after gripping of the first actuation member 10a1 by the first partial groove 20a, the retractor member 4e1 knocks the first actuation member 10a1 out of the first partial groove 20a, as can be seen in FIGS. 4b and 4c, and the third rotatable unit 10 resumes co-rotating with the second rotatable unit 4.

In this example, the third rotatable unit 10 includes a retainer 24. In this example, the retainer 24 is hingedly connected to the body portion 10b of the third rotatable unit 10. Here, the retainer 24 includes a tooth 26. The tooth 26 is biased by a resilient element, here a spring 28. The second rotatable unit 4 includes a, here three, notch 30. Here the notch 30 has an angled face 30a. As can be seen in FIG. 4b, when the retractor member 4e1 has knocked the first actuation member 10a1 out of the first partial groove 20a the tooth 26 of the retainer 24 is on the angled face 30a of the notch 30. Due to the biasing force of the resilient element 28, the tooth 26 is pushed along the angled face 30a to the bottom of the notch 30, as can be seen in FIG. 4b. As a result, the third rotatable unit 10 assumes a defined angular position relative to the second rotatable unit 4. Also, the slight angular movement from the situation shown in FIG. 4b, with the actuation member 10a1 just freed from the groove 20, to the situation shown in FIG. 4c, enables that the retractor member 4e1 lifts the actuation member 10a1 away from the groove 20, so that mechanical contact between the actuation member 10a1 and the fourth unit 16 can be avoided.

Having been rotated over 60 degrees, the third rotatable unit 10 has been rotated from a first position to a second position, or from a second position to a first position relative to the second rotatable unit 4. Now, the first actuation member 10a1 is maintained in a non-deployed position by the retractor member 4e and is maintained at a distance from the selector 18.

At approximately the same time, the other retractor member 4e3 is also rotated and releases the second actuation member 10a2 to engage the fourth unit 16. However, as can be seen in FIG. 7, the second actuation member 10a2 cannot enter into the first partial groove 20a, as the shape of the second actuation member 10a2 requires the third partial groove 20c to align with the first partial groove 20a for allowing the second actuation member 10a2 to enter into the first partial groove 20a. The second actuation member 10a2 will slide along the surface of the selector 18 without being gripped.

For again actuating the third rotatable unit 10, the second partial groove 20b is moved out of alignment with the first partial groove 20a, and the third partial groove 20c is moved into alignment with the first partial groove 20a. In this situation, the second actuation member 10a2 can enter into the first partial groove 20a. It will be appreciated that it can be possible that the second actuation member 10a2 can already enter into the first partial groove 20a when the first partial groove 20a and the third partial groove 20c are not yet in complete alignment. Hence, the second actuation member 10a2 can already enter into the first partial groove 20a when the third partial groove 20c is still moving into alignment with the first partial groove 20a. When the second actuation member 10a2 has entered into the first partial groove, the first partial groove 20a supports the second actuation member 10a2, allowing a force to be guided from the fourth unit 16 via the second actuation member 10a2 to the third rotatable unit 10. As a result, the third rotatable unit 10 will again be halted, and when, in use, the second rotatable unit 4 will remain rotating, the third rotatable unit 10 will be rotated relative to the second rotatable unit 4. The tooth 26 of the retainer 24 will be moved out of the notch 30 by sliding over a second angled face 30b of the notch. When the second rotatable unit 4 has rotated over approximately 60 degrees after gripping of the second actuation member 10a2 by the first partial groove 20a, the retractor member 4e, now 4e2, knocks the second actuation member 10a2 out of the first partial groove 20a and the third rotatable unit 10 resumes co-rotating with the second rotatable unit 4 again. The tooth 26 of the retainer 24 will be seated at the bottom of a notch 30 again. Having been rotated over 60 degrees, the third rotatable unit 10 has been rotated from a second position to a first position, or from a first position to a second position relative to the second rotatable unit 4. Now, the second actuation member 10*a*2 is maintained in a non-deployed position by the retractor member 4*e* again and is maintained at a distance from the selector 18 as shown in FIG. 4*a*.

At approximately the same time, the other retractor member 4*e*1 is also rotated and again releases the first actuation member 10*a*1 to engage the fourth unit 16. However, the first actuation member 10*a*1 cannot enter into the first partial groove 20*a*, as the shape of the first actuation member 10*a*1 requires the second partial groove 20*b* to align with the first partial groove 20*a* for allowing the first actuation member 10*a*1 to enter into the first partial groove 20*a*. The first actuation member 10*a*1 will now slide along the surface of the selector 18 without being gripped.

Thus, the selector 18 can be in a first mode for gripping the first actuation member and for not engaging the second actuation member, and in a second mode for gripping the second actuation member and not engaging the first actuation member.

It will be appreciated that in this example, forces from the third rotatable unit 10 via, the actuation members 10*a* are supported by the first partial groove 20*a* only. The second and third partial grooves 20*b*, 20*c* absorb no, or hardly any, force. The second and third partial grooves merely act as keys to select whether the first or second actuation member can enter the first partial groove 20*a* or not.

In the example of FIG. 6, it can be seen that the fourth unit 16 includes two toothed racks 22*a*, 22*b*. The first toothed rack 22*a* is connected to a bush carrying the second partial groove 20*b*. The second toothed rack 22*b* is connected to a bush carrying the third partial groove 20*c*. The toothed racks 22*a*, 22*b* can be driven by pinions of one or two electric motors.

In the example of FIGS. 6 and 7, the second partial groove 20*b* and the third partial groove 20*c* are arranged to be moved relative to the first partial groove 20*a* in a tangential displacement. Here the second and third partial grooves 20*b*, 20*c* are arranged to be moved simultaneously in opposite directions. In this example, the second partial groove 20*b* is arranged for moving in the same direction the as the first actuation member 10*a*1, i.e. along with the sliding of the first actuation member 10*a*1 along the surface of the selector 18, when the second partial groove 20*b* moves from the non-gripping mode to the gripping mode for the first actuation member 10*a*1. The third partial groove 20*c* is arranged for moving in the same direction as the second actuation member 10*a*2, i.e. along with the sliding of the second actuation member 10*a*2 along the surface of the selector 18, when the third partial groove 20*c* moves from the non-gripping mode to the gripping mode for the second actuation member 10*a*2. Hence, forces on the selector 18 are minimized, and symmetrical for both actuation members 10*a*.

Figure 8A:
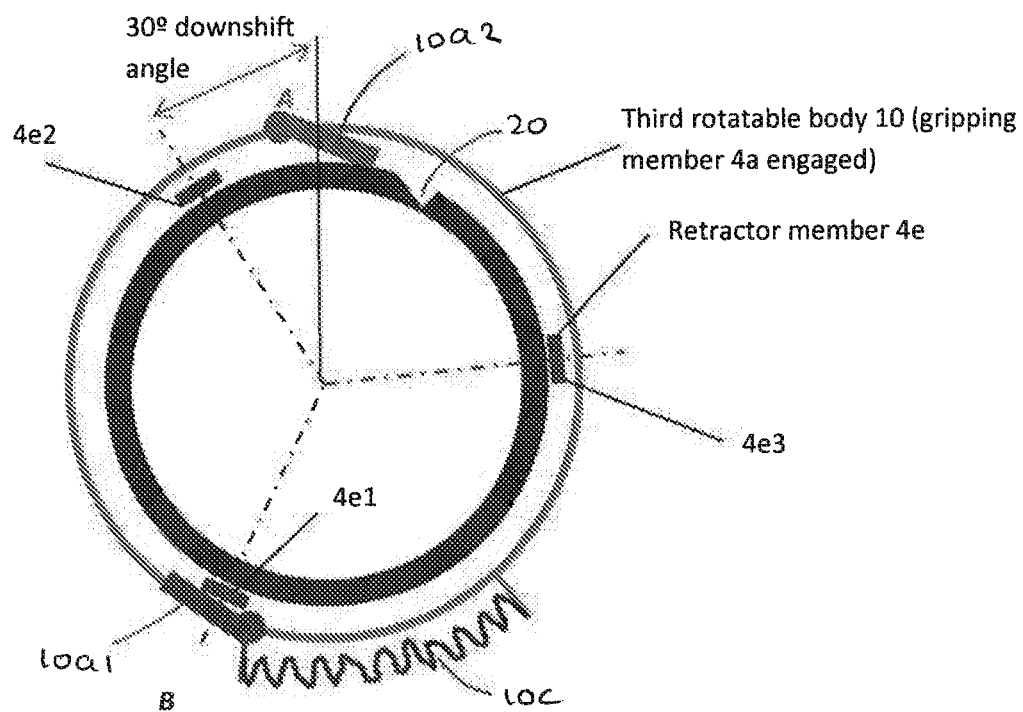
FIGS. 8a-8d show an example of gripping and ungripping the actuation members.
Figure 8B:
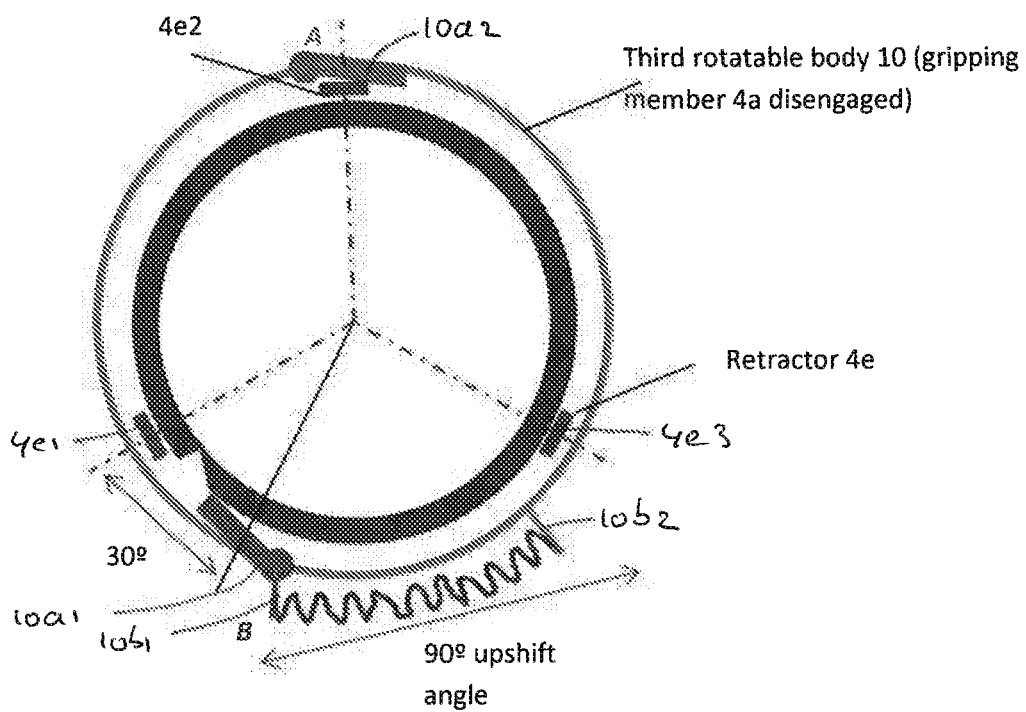
Figure 8C:
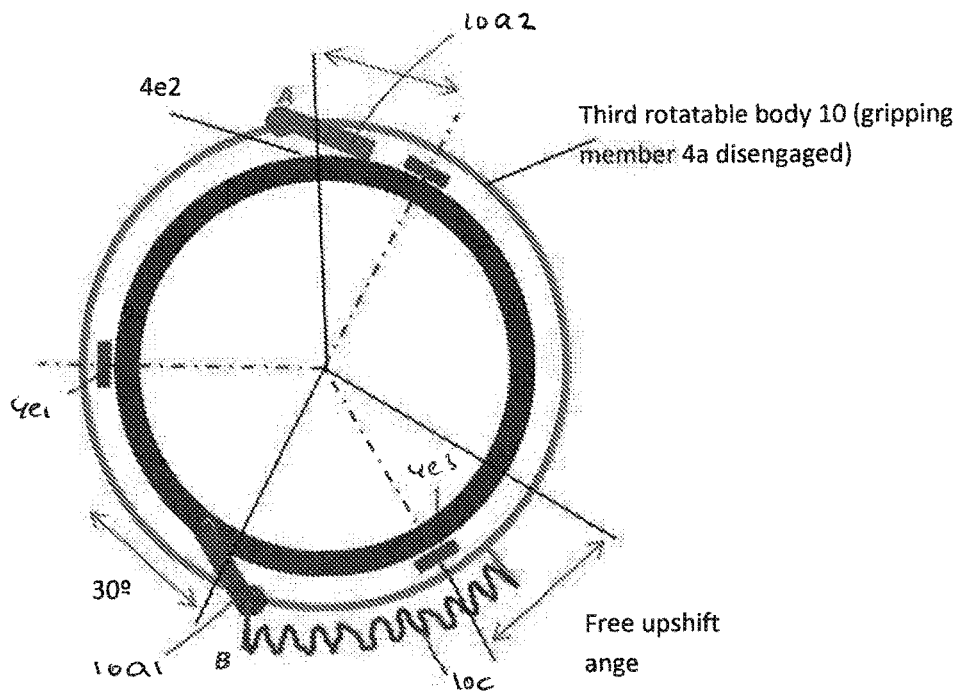
Figure 8D:
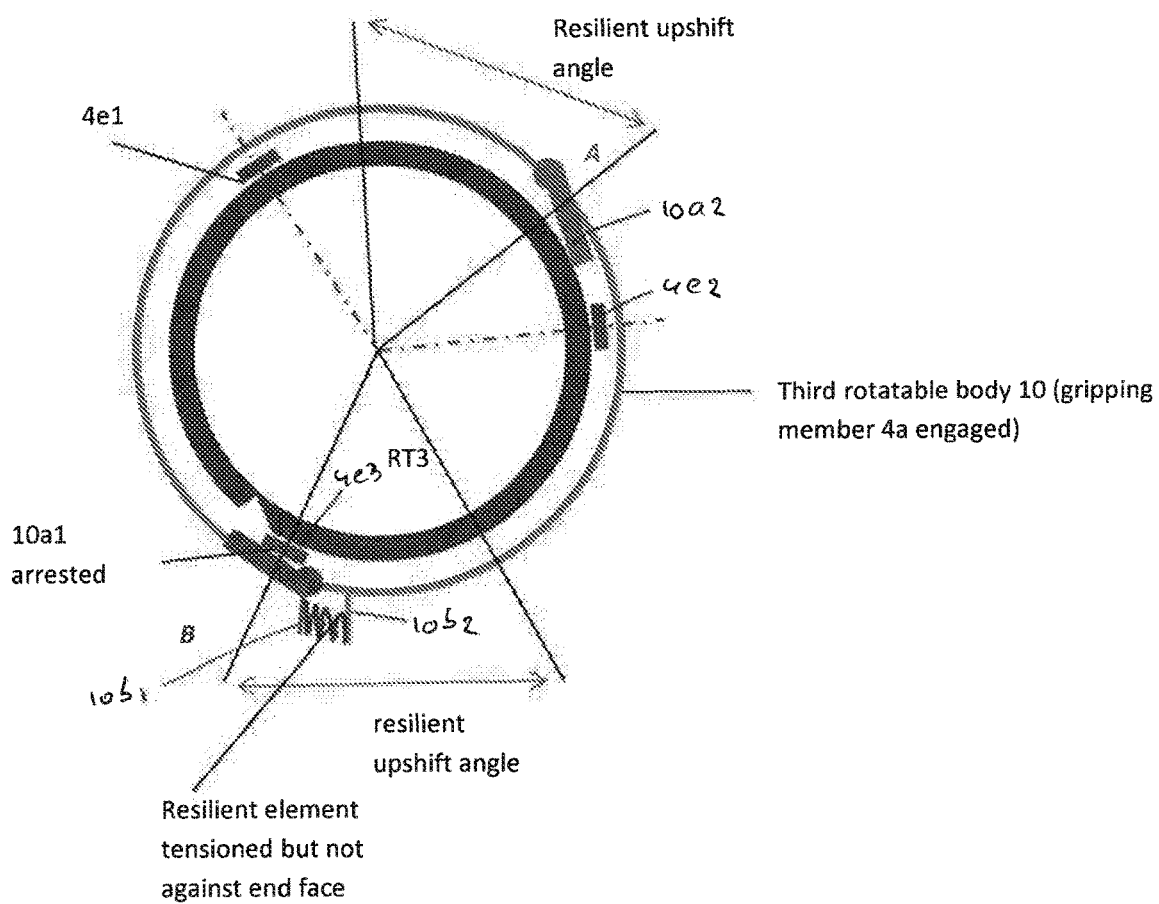

FIGS. 8*a*-8*d* show an example of gripping and ungripping the actuation members 10*a* in the groove 20. In FIG. 8*a* the first actuation member 10*a*1 is arrested on the retractor member 4*e*1. The second actuation member 10*a*2 is ready for being gripped by the groove 20. In FIG. 8*b* the second rotatable unit 4 having the retractor members 4*e* has been rotated over 30 degrees relative to the position in FIG. 8*a*. In FIG. 81) the second actuation member 10*a*2 is arrested on the retractor member 4*e*2. The first actuation member 10*a*1 is ready for being gripped by the groove 20. In FIG. 8*c* the first actuation member 10*a*1 has been gripped by the groove 20. The third rotatable body 10 does not rotate. The retractor member 4*e*2 slips from under the second actuation member 10*a*2. The gripping members 4*a* are not engaged with the first abutment surfaces. The second body portion 10*b*2 of the third rotatable body 10 is not entrained in rotation over the free upshift angle as no forces act on it. However, continued rotation of the first rotatable unit 2 relative to the third rotatable body 10 causes the gripping members 4*a* to engage. Then the second body portion 10*b*2 of the third rotatable body 10 co-rotates with the first rotatable unit 2 in view of the engaged griping members 4*a*. Then the resilient element 10*c* is compressed (FIG. 8*d*) as the first body portion 10*b*1 of the third rotatable body 10 is still prevented from rotating by the gripped first actuation member 10*a*1. When the first rotatable unit 2 is driven, the gripping members 4*a* can automatically disengage. When the first rotatable unit 2 is not driven, engagement of the gripping members 4*a* can maintain while the first actuation member 10*a*1 is lift from the groove and the first actuation member is arrested on the retractor 4*e*3 (forces arresting the first actuation member 10*a*1 on the retractor 4*e*3 must thereto be larger than the force of the compressed resilient element 10*e*). When the gripping members 4*a* are disengaged (e.g. by driving the first rotatable unit, e.g. by exerting force to the bicycle pedals) the second body portion 10*b*2 of the third rotatable body 10 is rotated back over the resilient upshift angle while relaxing the resilient member 10*e*. Herein the gripping members 4*a* are retained by the retaining members 12. Thus the situation of FIG. 8*a* is regained.

Figure 9A:
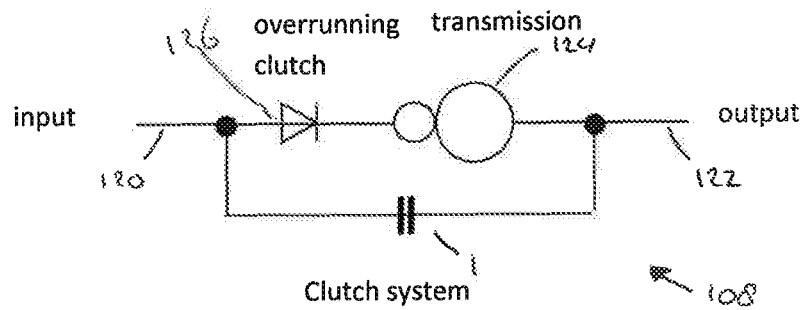
FIGS. 9a-9c show schematic examples of a torque transmission.

FIG. 9*a* shows a schematic example of a torque transmission 108. The torque transmission 108 includes an input 120 and an output 122. The torque transmission 108 includes a gear transmission 124. Here the gear transmission 124 is a reduction for converting a rotational speed at the input 120 to a reduced rotational speed at the output 122. The torque transmission also includes a clutch system 1, e.g. as described in view of FIGS. 1-7. The gear transmission 124 is selectably included in the torque transmission 108. The torque transmission is arranged for, in a first mode, transmitting the rotational speed at the input 120 unchanged to the output 122, when the clutch system 1 is engaged. The torque transmission is arranged for, in a second mode, transmitting the rotational speed at the input 120 reduced to the output 122, when the clutch system 1 is disengaged. An overrunning clutch 126 is included, in this example in series with the gear transmission 124.

Figure 10A:
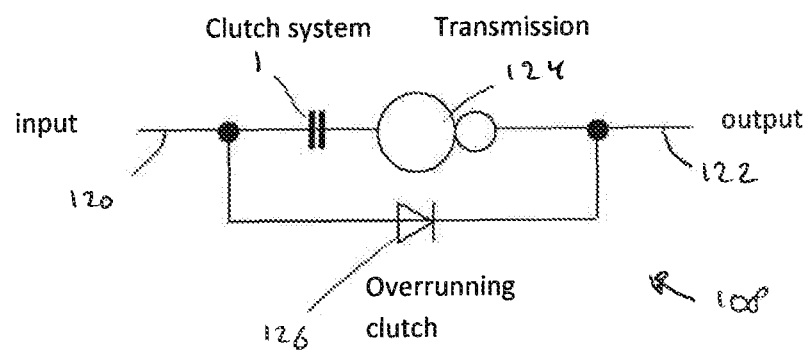
FIGS. 10a-10c show schematic examples of a torque transmission and
FIG. 11 shows an example of a wheel axle assembly.

FIG. 10*a* shows a schematic example of a torque transmission 108. The torque transmission 108 includes an input 120 and an output 122. The torque transmission 108 includes a gear transmission 124. Here the gear transmission 124 is a arranged for converting a rotational speed at the input 120 to an increased rotational speed at the output 122. The torque transmission also includes a clutch system 1, e.g. as described in view of FIGS. 1-7. The gear transmission 124 is selectably included in the torque transmission 108. The torque transmission is arranged for, in a first mode, transmitting the rotational speed at the input 120 unchanged to the output 122, when the clutch system 1 is disengaged. The torque transmission is arranged for, in a second mode, transmitting the rotational speed at the input 120 increased to the output 122, when the clutch system 1 is engaged. An overrunning clutch 126 is included, in this example in parallel with the gear transmission 124.

Figure 9B:
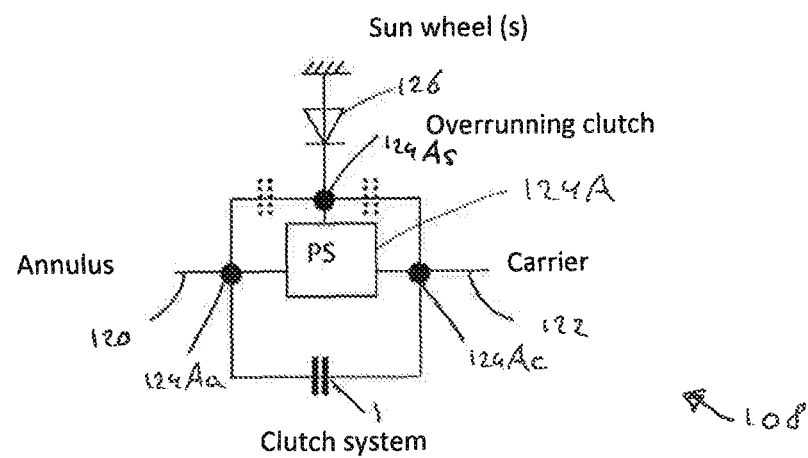

FIG. 9*b* shows a schematic example of a torque transmission 108. The torque transmission 108 includes an input 120 and an output 122. The torque transmission 108 includes a gear transmission 124. Here the gear transmission 124 is a planetary gear system 124A for converting a rotational speed at the input 120 to a reduced rotational speed at the output 122. In this example, the input 120 is connected to the annulus 124Aa of the planetary gear system 124A. Here, the output 122 is connected to the carrier 124Ac of the planetary gear system 124A. The torque transmission also includes a clutch system 1, e.g. as described in view of FIGS. 1-7, here included selectively connecting the annulus and the carrier. The sun wheel 124As of the planetary gear system 124A is connected to a non-rotary part via the overrunning clutch 126. The torque transmission is arranged for, in a first mode, transmitting the rotational speed at the input 120 unchanged to the output 122, when the clutch system 1 is engaged. The torque transmission is arranged for, in a second mode, transmitting the rotational speed at the input 120 reduced to the output 122, when the clutch system 1 is disengaged. Decoupling of the overrunning clutch 126 may be required for allowing the output 122 in reverse direction. An input overrunning clutch 128 may be required for freewheeling, e.g. while driving without pedaling.

Figures 9C, 10C:
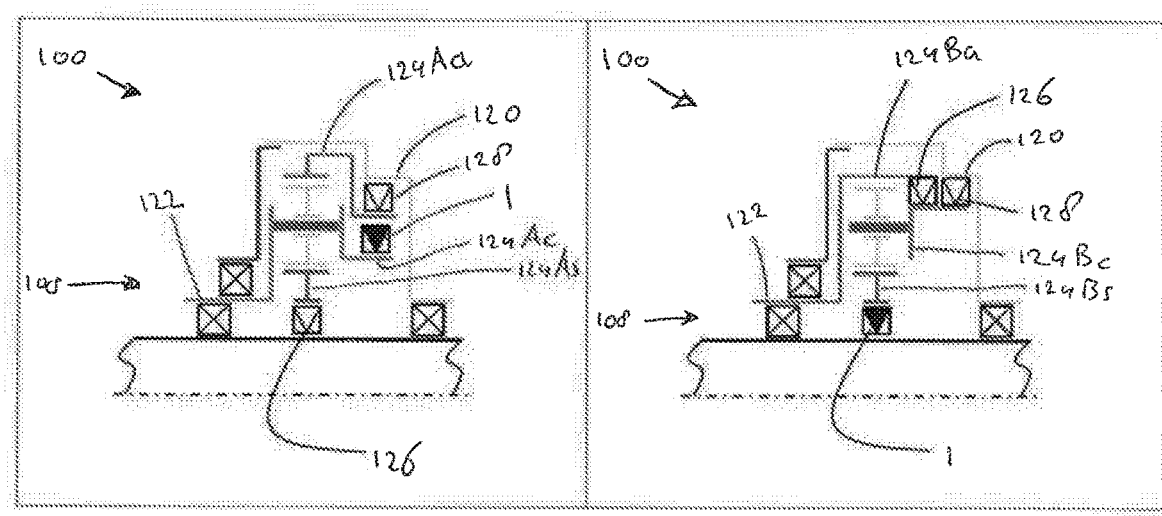

FIG. 9c shows a schematic cross section of a torque transmission 108 according to FIG. 9b in an axle assembly 100, such as a bicycle rear wheel assembly.

Figure 10B:
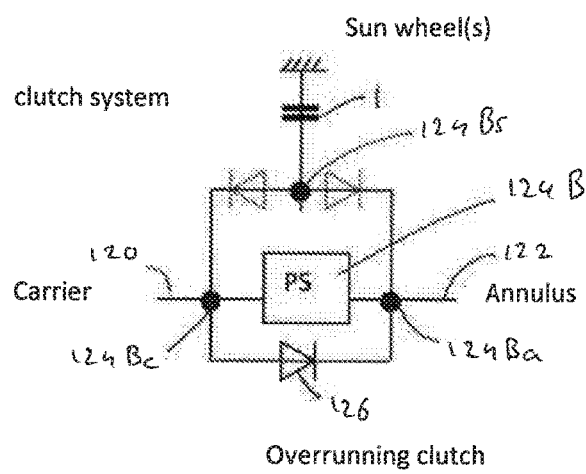

FIG. 10b shows a schematic example of a torque transmission 108. The torque transmission 108 includes an input 120 and an output 122. The torque transmission 108 includes a gear transmission 124. Here the gear transmission 124 is a planetary gear system 124B for converting a rotational speed at the input 120 to an increased rotational speed at the output 122. In this example, the input 120 is connected to the carrier 124Bc of the planetary gear system 124B. Here, the output 122 is connected to the annulus 124Ba of the planetary gear system 124B. The torque transmission also includes a clutch system 1, e.g. as described in view of FIGS. 1-7, here included selectively connecting the sun wheel 124Bs of the planetary gear system 124B to a non-rotary part. The carrier is connected to the annulus via an overrunning clutch 126. The torque transmission is arranged for, in a first mode, transmitting the rotational speed at the input 120 unchanged to the output 122, when the clutch system 1 is disengaged. The torque transmission is arranged for, in a second mode, transmitting the rotational speed at the input 120 reduced to the output 122, when the clutch system 1 is engaged. Decoupling of the overrunning clutch 126 may be required for allowing the output 122 in reverse direction. An input overrunning clutch 128 may be required for freewheeling, e.g. while driving without pedaling.

FIG. 10c shows a schematic cross section of a torque transmission 108 according to FIG. 10b in an axle assembly 100, such as a bicycle rear wheel assembly.

Figure 11:
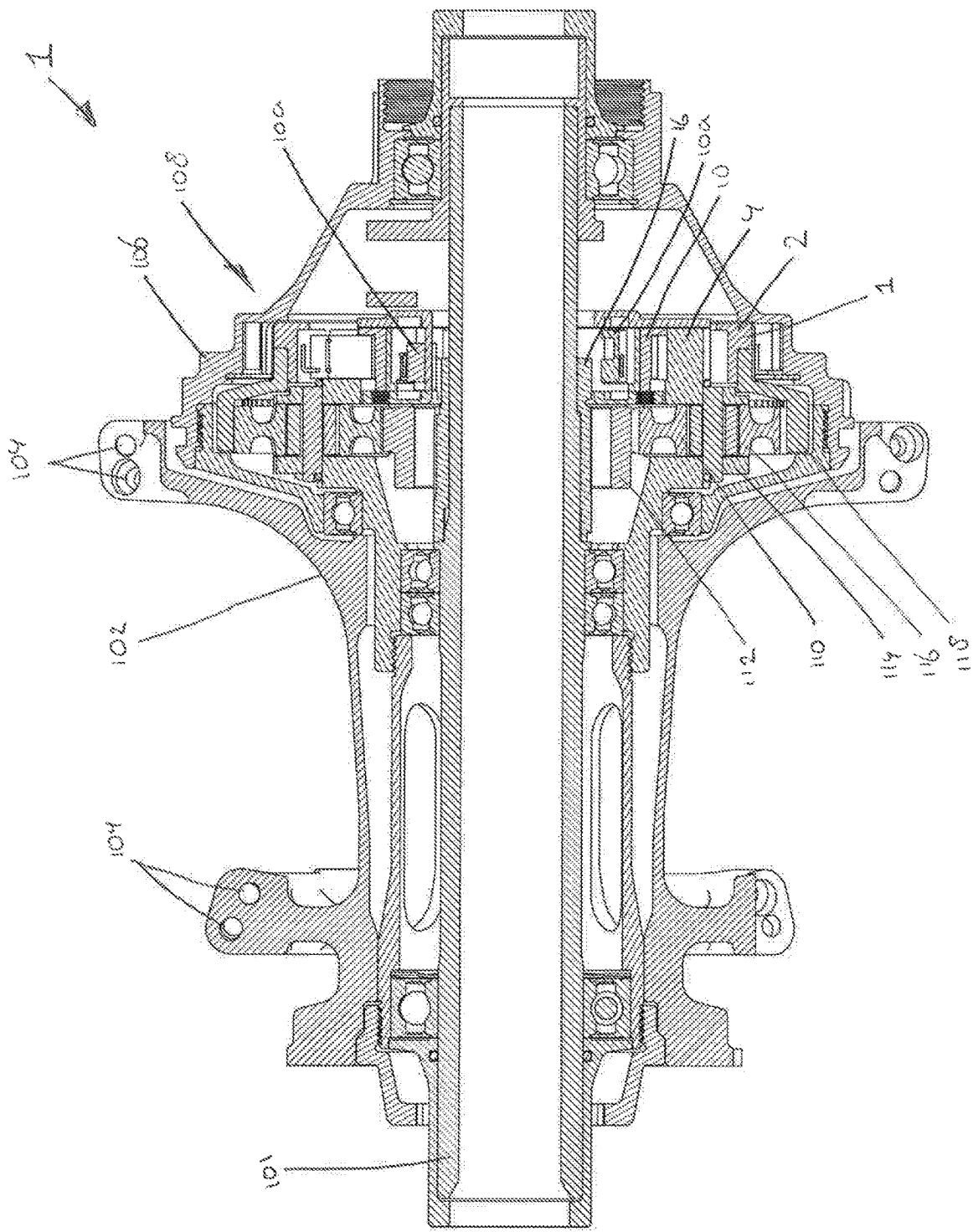

FIG. 11 shows an example of an axle assembly 100. In this example, the axle assembly is a rear bicycle assembly. The axle assembly 100 here includes a hollow axle 101. In this example, the hollow axle 101 is arranged for non-rotatably being fixed to a frame, e.g. a bicycle frame. In this example the axle assembly is an axle assembly for a bicycle. The axle assembly 100 includes a hub 102. Here the hub 102 is provided with apertures 104, e.g. for connection of spokes of a wheel, The axle assembly 102 further includes a driver 106. The driver 106 in this example is arranged for receiving a cassette of gear wheels (not shown).

The axle assembly 100 in this example includes a torque transmission 108, Here the torque transmission includes a clutch system 1, e.g. as described in view of FIGS. 1-7, and a gear means, here a planetary gear 110, The planetary gear 110 includes a sun gear 112, a planet carrier 114 with planet gears 116 and a ring gear 118. The clutch system 1 is arranged in the torque transmission 108 so as to selectively couple two of the sun gear, the planet carrier and the ring gear. In this example, In this example, the clutch system 1 is arranged in the torque transmission 108 so as to selectively couple the planet carrier 114 and the ring gear 118.

The planet carrier 114 is also fixedly coupled to the hub 102. Therefore, depending on whether the first rotatable unit 2 and second rotatable unit 4 are rotationally coupled, or rotationally disengaged, driving the driver 106 causes the hub 102 to rotate according to a first or second gear ratio relative to the driver 106. An overrunning clutch may thereto be positioned between the sun gear 112 and the axle 101. In the examples of FIGS. 1-7 and 8, the first rotatable unit 2, the second rotatable unit 4, the third rotatable unit 10, and the fourth unit 16 are coaxial. Here, the fourth unit 16 is positioned at least partially within the third rotatable unit 10. Here the third rotatable unit 10 is at least partially positioned within the second rotatable unit 4. Here the second rotatable unit 4 is at least partially positioned within the first rotatable unit 2.

The clutch system 1 can e.g. be used for selectively operating a planetary gear according to a first mode when the second rotatable unit is engaged with the first rotatable unit, and according to a second mode when the second rotatable unit is disengaged from the first rotatable unit. Hence, the clutch system 1 can be used in a torque transmission for operating the torque transmission at a first transmission ratio in the first mode, and at a second, different transmission ratio in the second mode. The clutch system can e.g. be used in a rear hub of a bicycle. The clutch system can then be used e.g. for emulating the functioning of a front derailleur, so as to be able to omit the front derailleur from the bicycle. The invention also relates to a bicycle including such clutch system.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

In the examples, the first rotatable unit includes nine first abutment surfaces. It will be appreciated that other numbers of first abutment surfaces, such as one, two, three, four, six or any other suitable number are also possible. In the examples, the second rotatable unit includes three second abutment surfaces. It will be appreciated that other numbers of second abutment surfaces, such as one, two, four, six or any other suitable number are also possible. In the examples, the third rotatable unit includes three retaining members. It will be appreciated that other numbers of retaining members, such as one, two, four, six or any other suitable number are also possible. In the examples, the third rotatable unit includes two actuation members. It will be appreciated that other numbers of actuation members, such as one, three, four six or any other suitable number are also possible.

In the examples, the gripping members are separate items hingedly connected to the body portion of the second rotatable unit. It will be appreciated that it is also possible that the gripping members are integral with the body portion of the second rotatable unit.

In the examples, the third rotatable unit includes an first body portion and a second body portion. It will be appreciated that the first and second body portions may also be an integral portion.

In the examples, the actuation members are separate items hingedly connected to the body portion of the third rotatable unit. It will de appreciated that it is also possible that the actuation members are integral with the body portion of the third rotatable unit.

In the examples, the gripping members are arranged for pivoting in a radial direction. It will be appreciated that it is also possible that the gripping members are arranged for pivoting in an axial direction. Then e.g. the second rotatable unit and the first rotatable unit can be positioned, at least partially, axially next to each other. Also, then the third rotatable unit and the second rotatable unit can be positions, at least partially, axially next to each other.

In the examples, the actuation members are arranged for pivoting in a radial direction. It will be appreciated that it is also possible that the actuation members are arranged for pivoting in an axial direction. Then e.g. the third rotatable unit and the fourth unit can be positioned, at least partially, axially next to each other.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A clutch system for a torque transmission having an input arranged for connection to a drive source, and an output arranged for connection to a load, the clutch system including:
   a first rotatable unit connectable to the input, including at least one first abutment surface;
   a second rotatable unit connectable to the output, including at least one second abutment surface arranged for selectively engaging the at least one first abutment surface, the at least one first and second abutment surfaces being adapted to each other so as to allow disengaging under load;
   a third rotatable unit including at least one retaining member, the third rotatable unit being arranged for selectively being in a first position or a second position relative to the second rotatable unit, wherein the at least one retaining member in the first position locks the at least one second abutment surface in engagement with the at least one first abutment surface, preventing the at least one second abutment surface from disengaging from the at least one first abutment surface, for rotationally coupling the second rotatable unit to the first rotatable unit, and in the second position releases the at least one second abutment surface for disengagement of the at least one first abutment surface for decoupling the second rotatable unit from the first rotatable unit.

2. The clutch system according to claim 1, wherein the third rotatable unit is arranged for co-rotating with the second rotatable unit, and the clutch system is arranged for temporarily changing rotation speed of the third rotatable unit relative to the second rotatable unit for rotating from the first position to the second position, or from the second position to the first position.

3. The clutch system according to claim 1, including an actuator for rotating the third rotatable unit and/or the second rotatable unit from the first position to the second position, and/or from the second position to the first position.

4. The clutch system according to claim 3, wherein the actuator is triggerable from outside the clutch system.

5. The clutch system according to claim 1, wherein the third rotatable unit is rotatable relative to the second rotatable unit, and a rotation angle of the third rotatable unit relative to the second rotatable unit is unlimited.

6. The clutch system according to claim 5, wherein the third rotatable unit is arranged to be rotated from the first position to the second position, and from the second position to the first position in one and the same rotational direction.

7. The clutch system according to claim 5, wherein the third rotatable unit is arranged for selectively being in one of a plurality of first or second positions relative to the second rotatable unit.

8. The clutch system according to claim 1, wherein the engagement or disengagement of the second abutment surface with the at least one first abutment surface is independent of input torque and/or rotation speed.

9. The clutch system according to claim 1, wherein the third rotatable unit includes at least one actuation member arranged for moving the third rotatable unit from a first position to a second position or from a second position to a first position relative to the second rotatable unit.

10. The clutch system according to claim 9, further including a fourth unit including a selector, the selector being arranged for selectively being in a gripping mode or a non-gripping mode,
   the selector in the gripping mode being arranged for gripping the at least one actuation member for rotating the third rotatable unit from the first position to the second position or from the second position to the first position relative to the second rotatable unit;
   the selector in the non-gripping mode being arranged for not engaging the at least one actuation member.

11. A clutch system for a torque transmission having an input arranged for connection to a drive source, and an output arranged for connection to a load, the clutch system including:
   a first rotatable unit connectable to the input;
   a second rotatable unit connectable to the output;
   a third rotatable unit being arranged for selectively being in a first rotational position or a second rotational position relative to the second rotatable unit, wherein the system is arranged for selectively in the first rotational position rotationally coupling the second rotatable unit to the first rotatable unit, and in the second rotational position decoupling the second rotatable unit from the first rotatable unit, wherein the third rotatable unit includes at least one actuation member arranged for moving the third rotatable unit from the first position to the second position or from the second position to the first position relative to the second rotatable unit; and a fourth unit including a selector, the selector being arranged for selectively being in a gripping mode or a non-gripping mode, the selector in the gripping mode being arranged for gripping the at least one actuation member for rotating the third rotatable unit from the first position to the second position or from the second position to the first position relative to the second rotatable unit;

the selector in the non-gripping mode being arranged for not engaging the at least one actuation member.

12. The clutch system according to claim 11, wherein the first rotatable unit includes at least one first abutment surface, and the second rotatable unit includes at least one second abutment surface arranged for selectively engaging the first abutment surface, wherein the third rotatable unit includes at least one retaining member arranged for in the first position locking the at least one second abutment surface in engagement with the at least one first abutment surface for rotationally coupling the second rotatable unit to the first rotatable unit, and in the second position releasing the at least one second abutment surface for disengagement of the at least one first abutment surface for decoupling the second rotatable unit from the first rotatable unit.

13. The clutch system according to claim 1, wherein the third rotatable unit includes a first body and a second body, wherein the first body includes the at least one retaining member, and the second body includes the at least one actuation member.

14. The clutch system according to claim 13, wherein the first body is rotationally resiliently coupled to the second body.

15. The clutch system according to claim 1, the second rotatable unit including a retractor member arranged for moving the at least one actuation member out of engagement with the fourth unit.

16. The clutch system according to claim 11, wherein the selector includes a groove including a first partial groove and a second partial groove, wherein in the gripping mode the first and second partial grooves allow engaging the at least one actuation member, and in the non-gripping mode the first and second partial grooves allow preventing engagement of the at least one actuation member.

17. The clutch system according to claim 11, including two actuation members arranged such that when the first actuation member is biased into contact with the selector, the second actuation member is maintained at a distance from the selector and vice versa.

18. The clutch system according to claim 17, wherein the selector is arranged to be in a first mode or in a second mode, wherein in the first mode the selector is in the gripping mode for the first actuation member and in the non-gripping mode for the second actuation member, and in the second mode the selector is in the non-gripping mode for the first actuation member and in the gripping mode for the second actuation member.

19. The clutch system according to claim 18, wherein the selector includes a groove including a first partial groove, a second partial groove and a third partial groove, wherein in the first mode the first and second partial grooves allow gripping the first actuation member, and in the second mode the second and third grooves allow gripping the second actuation member.

20. The clutch system according to claim 19, wherein the second partial groove and the third partial groove are arranged to be moved.

21. The clutch system according to claim 20, wherein the second and third partial groove are arranged to be moved in opposite directions.

22. The clutch system according to claim 21, wherein the second partial groove is arranged for moving in the same direction as the first actuation member when the second partial groove moves from the non-gripping mode to the gripping mode for the first actuation member, and the third partial groove is arranged for moving in the same direction as the second actuation member when the third partial groove moves from the non-gripping mode to the gripping mode for the second actuation member.

23. The clutch system according to claim 1, wherein the at least one second abutment surface is a gripping member arranged for radially moving in and out of engagement with the at least one first abutment surface.

24. The clutch system according to claim 1, wherein the at least one first and/or second abutment surface is biased to disengage.

25. The clutch system according to claim 1, including a plurality of first and/or second abutment surfaces and a plurality of retaining members.

26. The clutch system according to claim 11, wherein first, second, third, and/or fourth unit are coaxial.

27. A torque transmission, including a clutch system according to claim 1, and a planetary gear, wherein the clutch system is arranged in the torque transmission so as to selectively couple two of the group consisting of: a sun gear, a planet carrier and a ring gear.

28. A wheel axle assembly including a torque transmission according to claim 27.

29. A wheel axle assembly according to claim 28, arranged for receiving a cassette having a plurality of gear wheels.

30. A bicycle including a clutch system according to claim 1.

* * * * *